(12) United States Patent
Peterson et al.

(10) Patent No.: US 7,971,449 B2
(45) Date of Patent: Jul. 5, 2011

(54) HEAT-ACTIVATED HEAT-PUMP SYSTEMS INCLUDING INTEGRATED EXPANDER/COMPRESSOR AND REGENERATOR

(75) Inventors: Richard B. Peterson, Corvallis, OR (US); Thomas G. Herron, Bend, OR (US); Monte K. Drost, Corvallis, OR (US)

(73) Assignee: State of Oregon acting by and through the State Board of Higher Education on Behalf of Oregon State University, Corvallis, OR (US)

( * ) Notice: Subject to any disclaimer, the term of this patent is extended or adjusted under 35 U.S.C. 154(b) by 1143 days.

(21) Appl. No.: 11/660,170

(22) PCT Filed: Aug. 15, 2005

(86) PCT No.: PCT/US2005/029112
§ 371 (c)(1),
(2), (4) Date: Feb. 13, 2007

(87) PCT Pub. No.: WO2007/008225
PCT Pub. Date: Jan. 18, 2007

(65) Prior Publication Data
US 2008/0006040 A1 Jan. 10, 2008

Related U.S. Application Data

(60) Provisional application No. 60/601,478, filed on Aug. 14, 2004.

(51) Int. Cl.
*F25B 13/00* (2006.01)
(52) U.S. Cl. .......................... 62/324.1; 62/116
(58) Field of Classification Search .................... 62/116, 62/323.1, 324.1, 324.6
See application file for complete search history.

(56) References Cited

U.S. PATENT DOCUMENTS

| | | | |
|---|---|---|---|
| 2,869,332 A | | 1/1959 | Keller |
| 3,153,442 A | * | 10/1964 | Silvern ............................ 165/50 |
| 3,259,176 A | | 7/1966 | Rice et al. |
| 3,519,065 A | * | 7/1970 | Kitrilakis ........................ 165/97 |
| 3,519,066 A | * | 7/1970 | Anderson ....................... 165/50 |
| 3,922,877 A | | 12/1975 | Ophir et al. |
| 3,945,210 A | | 3/1976 | Chapin |

(Continued)

OTHER PUBLICATIONS

Garris, Charles A., Jr. et al., "The Pressure-Exchange Ejector Heat Pump," AES-vol. 38, Proceedings of the ASME Advanced Energy Systems Division, ASME 1998.

(Continued)

*Primary Examiner* — Melvin Jones
(74) *Attorney, Agent, or Firm* — Klarquist Sparkman, LLP

(57) ABSTRACT

Heat-activated heat-pump systems and related methods are disclosed that include a power cycle coupled to a vapor-compression refrigeration cycle both utilizing the same working fluid. The power cycle comprises a boiler, an expander receiving superheated vapor and producing work from the superheated vapor, a condenser, and a pump. A regenerator conducts a first stream of working fluid from the pump to the boiler and a second stream of the working fluid from the expander to the condenser while transferring heat from the second stream to the first stream. The refrigeration cycle comprises a compressor that compresses the working fluid from the evaporator and delivers the compressed working fluid to a condenser. The expander and compressor are coupled together such that at least a portion of the work produced by the expander is utilized for running the compressor.

59 Claims, 36 Drawing Sheets

U.S. PATENT DOCUMENTS

| | | | |
|---|---|---|---|
| 4,055,964 A | 11/1977 | Swenson et al. | |
| 4,285,208 A | 8/1981 | Takeshita et al. | |
| 4,326,391 A | 4/1982 | Sato et al. | |
| 4,342,200 A | 8/1982 | Lowi, Jr. | |
| 4,342,201 A | 8/1982 | Ishii | |
| 4,347,711 A | 9/1982 | Noe et al. | |
| 4,361,015 A | 11/1982 | Apte | |
| 4,437,316 A | 3/1984 | Dyer et al. | |
| 4,645,428 A | 2/1987 | Arregui et al. | |
| 4,883,414 A | 11/1989 | Schabert | |
| 4,984,432 A | 1/1991 | Corey | |
| 4,987,750 A | 1/1991 | Meckler | |
| 5,115,644 A | 5/1992 | Alsenz | |
| 5,347,823 A | 9/1994 | Alsenz | |
| 5,392,606 A | 2/1995 | Labinov et al. | |
| 5,497,635 A | 3/1996 | Alsenz | |
| 5,647,221 A | 7/1997 | Garris, Jr. | |
| 5,749,226 A | 5/1998 | Bowman et al. | |
| 5,811,062 A | 9/1998 | Wegeng et al. | |
| 5,932,940 A | 8/1999 | Epstein et al. | |
| 6,138,456 A | 10/2000 | Garris | |
| 6,148,635 A | 11/2000 | Beebe et al. | |
| 6,283,723 B1 | 9/2001 | Milburn et al. | |
| 6,401,686 B1 | 6/2002 | Prueitt et al. | |
| 6,581,384 B1 * | 6/2003 | Benson | 60/653 |
| 6,644,045 B1 | 11/2003 | Tang et al. | |
| 6,892,802 B2 | 5/2005 | Kelly et al. | |

OTHER PUBLICATIONS

Huang, B.J. et al., "Ejector Performance Characteristics and Design Analysis of Jet Refrigeration System," vol. 107, Transactions of the ASME, Jul. 1985, pp. 792-802.

Cahill, J.W., "A Novel Engine and Heat Pump," www.eigenmorph.com, undated, pp. 1-5.

* cited by examiner

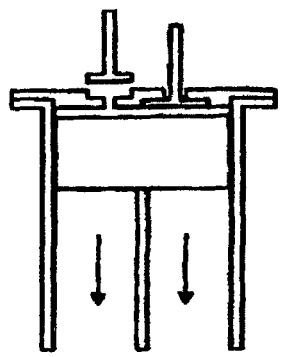 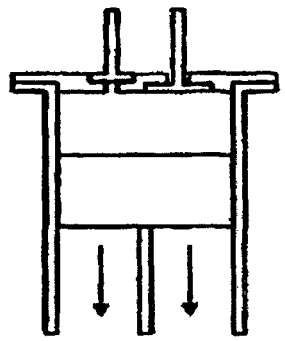 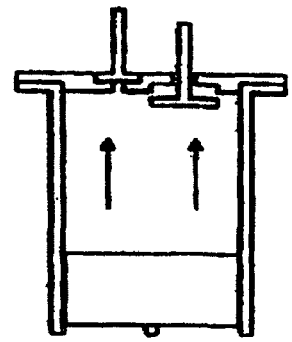
FIG. 8(a)    FIG. 8(b)    FIG. 8(c)
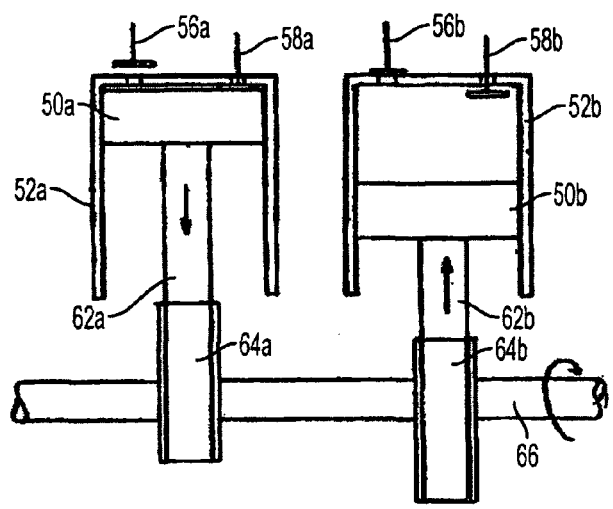
FIG. 9(a)

HEAT-ACTIVATED HEAT-PUMP SYSTEMS INCLUDING INTEGRATED EXPANDER/COMPRESSOR AND REGENERATOR

CROSS REFERENCE TO RELATED APPLICATIONS

This is the U.S. National Stage of International Application No. PCT/US2005/029112, filed Aug. 15, 2005, which was published in English under PCT Article 21(2), which in turn claims the benefit of U.S. Provisional Application No. 60/601,478, filed Aug. 14, 2004. Both applications are incorporated herein in their entirety.

ACKNOWLEDGMENT OF GOVERNMENT SUPPORT

This invention was developed under contract no. CFDA 12.910 from the U.S. Department of Defense. The U.S. government has certain rights in this invention.

FIELD

This disclosure is directed to, inter alia, heat-activated thermodynamic cycles and heat-pump systems that include a power cycle and a refrigeration cycle. The systems include an integrated expander/compressor and at least one "regenerator" (heat-exchanger), and are especially suitable for use in, for example, compact and light-weight cooling units for vehicles and individual personnel.

BACKGROUND

Combustion-driven, heat-activated heat pumps used for heating and/or cooling have a large performance advantage in terms of size and weight over battery-powered heat-pumping devices. This is due in part to the respective energy densities of commonly used liquid-hydrocarbon fuels (in the vicinity of 42 kJ/g for JP-8 and diesel fuel) compared to the energy densities of zinc/air batteries (approximately 1.2 kJ/g) and of lead-acid batteries (approximately 0.12 kJ/g). High-performance, heat-activated cooling systems able to exploit this advantage of hydrocarbon fuels (by combusting them) would have many commercial and military applications such as cooling of personnel-protective suits (e.g., chemical- and/or biological-protective suits), cooling of vehicle interiors, and recovering and using waste heat from other processes. Even with a heat-to-work conversion efficiency of 10 to 20%, a combustion-driven heat-activated cooling system would be smaller and lighter, and could operate for longer periods of time (compared to battery-powered units) if component size and weight could be effectively limited.

Heat-activated heat-pumps are similar to conventional vapor-compression heat-pumps in that both utilize a working fluid and both include a compressor. In general, the primary difference between a heat-activated heat-pump and a vapor-compression heat-pump is the manner in which compression of the working fluid is accomplished, or in the manner in which power is supplied to the compressor. For example, a classic heat-activated refrigeration process is utilizes a jet-ejector cycle. Although a jet-ejector cycle is simple in design, generally reliable, and able to utilize waste heat, this cycle has not found wide-spread application because it exhibits poor thermodynamic performance. Also, the efficiency of these systems is poor. For example, the heat-activate coefficient of performance (COP), defined as the amount of cooling provided by the cycle divided by the amount of heat required to drive the cycle, is usually very low, typically less than 0.3. Also, the efficiency of these devices diminishes with decreasing system size. For a portable system, a low COP not only increases the size and weight of the boiler and condenser in the Rankine portion of the cycle, but it also increases the weight and volume of fuel that must be carried.

BACKGROUND REFERENCES INCLUDE

Drost et al., 1998, "Miniature Heat Pumps for Portable and Distributed Space Conditioning Applications," *AIChE 1998 Spring National Meeting*, New Orleans;

Drost et al., 1999, "Mesoscopic Heat-Actuated Heat Pump Development," *ASME IMECE Conference*, Nashville, Tenn.;

Kouremenos et al., 1998, "Optimization of Enhanced Steam-Ejector Applied to Steam Jet Refrigeration," *Proceedings of the ASME Advanced Energy Systems Division*, AES-Vol. 38;

Huang et al., 1985, "Ejector Performance Characteristics and Design Analysis of Jet Refrigeration System," *J. Eng. Gas. Turbines and Power, ASME Transactions* 107(3):792-802;

Lee et al., "Influence of Cyclic Wall-to-Gas Heat Transfer in the Cylinder of the Valved Hot-Gas Engine," *Proceedings of the 13th Intersociety Energy Conversion Engineering Conference*, 1978, pp. 1798-1804;

Granet et al., *Thermodynamics and Heat Power*, 6th ed., Prentice-Hall, New Jersey, 2000, pp. 275-278.

SUMMARY

The deficiencies of conventional systems are addressed by systems and methods as disclosed herein.

According to a first aspect, heat-activated heat-pump systems are provided that comprise a power cycle coupled to a vapor-compression refrigeration cycle, wherein both cycles utilize the same working fluid. In an embodiment of such a system the power cycle comprises a boiler that vaporizes and superheats the working fluid, an expander coupled to receive superheated vapor from the boiler and configured to produce work from the superheated vapor, a condenser coupled to receive working fluid from the expander and configured to condense the working fluid, and a pump coupled to receive condensed working fluid from the condenser and to return the working fluid to the boiler. The power cycle also includes a regenerator coupled to conduct a first stream of the working fluid from the pump to the boiler and to conduct a second stream of the working fluid from the expander to the condenser while transferring heat from the second stream to the first stream. The refrigeration cycle comprises the condenser, a pressure-reducing throttling valve, an evaporator coupled to receive reduced-pressure working fluid via the throttling valve from the condenser and configured to expand the working fluid sufficiently to cool the working fluid, and a compressor configured to compress the working fluid from the evaporator and to deliver the compressed working fluid to the condenser. The expander and compressor are coupled together such that at least a portion of the work produced by the expander is utilized for running the compressor. The refrigeration cycle is essentially a vapor-compression cycle, and an exemplary power cycle in this system is a Rankine power cycle. By expanding the working fluid in the expander, the work generated by the expansion is effectively utilized for driving the compressor. Since the work output from the power cycle is used to drive the refrigeration cycle, an overall cycle performance is achieved that readily can exceed the performance of a conventional jet-ejector cycle.

The working fluid can be any suitable fluid capable of assuming liquid and vapor states at appropriate locations and times in the cycle under the conditions of use of the cycle. By way of example, the working fluid can be any of various hydrocarbons such as isopentane, any of various fluorocarbon refrigerants, or any of various other suitable working fluids.

The expander and the compressor desirably are at least coupled to each other. For example, the expander can comprise a shaft that is rotated by work produced in the expander, and the compressor can comprise a shaft. The shaft of the expander desirably is coupled to the shaft of the compressor so that, as the expander shaft rotates, corresponding rotation of the compressor shaft occurs. Further desirably, the expander and compressor are not only coupled to each other but also integrated with each other, such as in the same housing, to minimize thermal loss between these two components. A desirable performance standard is for the integrated expander and compressor to exhibit an isentropic efficiency of at least 70%.

The system also desirably further comprises a combustor coupled to the boiler, wherein the combustor is configured: (a) to combust a fuel to generate heat sufficient to vaporize and superheat the working fluid, and (b) to supply the heat to the working fluid in the boiler. The fuel can be any suitable fuel such as a hydrocarbon fuel. Further desirably, the combustor and the boiler are integrated with each other such that heat produced in the combustor is transferred in the boiler directly to the working fluid. By exploiting the higher stored-energy density of, for example, liquid hydrocarbons over batteries, this heat-pump cycle has a large performance advantage (size, weight, and portability) over conventional battery-powered vapor-compression systems.

The system further can comprise a coolant cycle coupled to the evaporator. In an embodiment the coolant cycle is configured to urge flow of a coolant from the evaporator, in which the coolant surrenders heat to the working fluid, to a cooling zone at which the coolant absorbs heat from a region in thermal contact with the cooling zone. (As used herein, "thermal contact" includes both direct contact and indirect contact. In either event, the contact is sufficient to achieve conduction of heat between the bodies in thermal contact with each other, so the conduction can be via an intermediate body.) By way of example, the coolant is water. This coolant can be used in an arrangement in which the cooling zone is a water chest in thermal contact with a person's body; thus, the circulating coolant cools the person's body. Such an application is especially advantageous in certain types of protective suits worn by a person, such as a chemical-protection suit or biological-isolation suit. In another application the cooling zone can be a heat-exchanger configured to cool vehicular air in thermal contact with the heat-exchanger. Such an application is especially advantageous for use in motor vehicles, especially as used in hot climates or other elevated-temperature conditions.

One or more of the heat-exchange components of the system (e.g., combustor/boiler, regenerator, condenser, and evaporator) can be configured using microtechnology-based structures to enhance heat transfer and to reduce system weight and volume. Computational models were developed and executed, as described herein, to estimate system performance for a set of given components and operating conditions. Results of one study revealed attainment of a heat-activate coefficient of performance (COP) of 1.3 with 100° C. of superheat over a saturation temperature of 116° C. This is a very good COP for a heat-activated system.

The foregoing and additional features and advantages of the subject systems and methods will be more readily apparent from the following detailed description, which proceeds with reference to the accompanying drawings.

BRIEF DESCRIPTION OF THE DRAWINGS

FIGS. 8(a)-8(c) schematically depict, for the first representative embodiment of the expander, three respective steps of a piston cycle. FIG. 8(a) depicts the start of a downward stroke, when the piston is at top-dead-center (TDC); FIG. 8(b) depicts the piston that has traveled about 30% of the downward stroke; and FIG. 8(c) depicts the piston at the end of the downward stroke, when the piston is at bottom-dead-center (BDC).

FIG. 9(a) schematically depicts certain details of the two pistons and their respective cylinders of the first representative embodiment of the expander.

FIG. 20($b$) is an exploded view showing more specific details of the flapper valves used in the first representative embodiment of the compressor.

DETAILED DESCRIPTION

Representative Embodiment of Heat-Pump System

Figure 1:
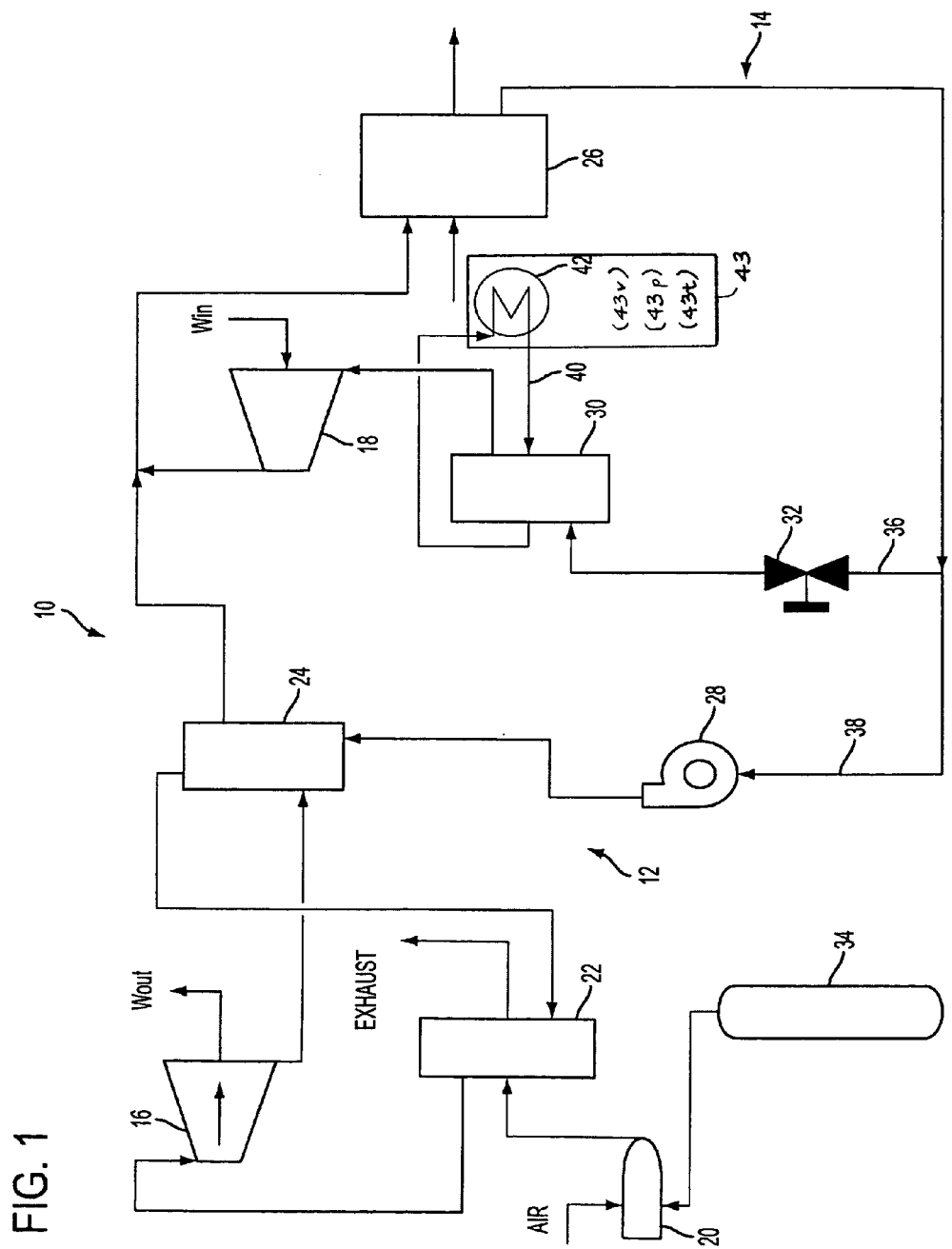
FIG. 1 is a schematic diagram of an exemplary embodiment of a heat-pump system (also termed a "cycle") including heat recovery.

A schematic diagram of an embodiment of a heat-pump system 10 (also termed a heat-pump "cycle") including heat recovery is shown in FIG. 1. The depicted system 10 represents a combination of a Rankine power cycle 12 and a vapor-compression refrigeration cycle 14. (A "cycle" in thermodynamic terms is a process in which a working fluid undergoes a series of state changes and finally returns to its initial state. A cycle plotted on a diagram of properties of the working fluid forms a closed curve.)

Unlike a conventional vapor-compression system that requires a substantial supply of electrical power for the compressor, the depicted system 10 relies on the work output of an expander 16 to drive a compressor 18. The system 10 utilizes a working fluid for heat cycling, and the same working fluid is used throughout the system.

The power cycle 12 includes a combustor 20, a "boiler" 22, the expander 16, a "regenerator" 24, a condenser 26, and a liquid pump 28. The combustor 20 generally is a component in which heat energy is produced (in this embodiment by burning a fuel) for adding to the system 10 that can be utilized by the system for producing work, as described later below. The boiler 22 generally is a component in which the working fluid, passing through the boiler, is heated (by input to the boiler of heat energy produced by a suitable source, which in this embodiment is the combustor 20) sufficiently to vaporize the working fluid and to superheat the vapor for producing work. The "regenerator" 24 is generally a heat-exchanger, which recovers heat from where it otherwise would be wasted and contributes the recovered heat to where it can be efficiently utilized. The condenser 26 generally is a component in which the working fluid is converted from a saturated vapor at elevated pressure to a liquid, which causes the working fluid to release heat in the condenser.

The refrigeration cycle 14 includes an evaporator 30, the compressor 18, the condenser 26, and a throttling valve 32 (also called an "expansion valve"). The evaporator 30 is generally a component in which working-fluid liquid under reduced pressure is evaporated, i.e., converted from a liquid into a vapor, which causes the working fluid to absorb heat in the evaporator. The compressor 18 generally is a component that increases the pressure of a working-fluid vapor as the vapor passes through the compressor. The throttling valve 32 generally is a component that imposes a substantial flow restriction to passage of working fluid liquid such that, as working fluid flows through the valve from upstream (where the fluid is at elevated pressure), the pressure of the working fluid drops sufficiently so that evaporation can occur in the downstream evaporator 30.

Fuel is supplied from a fuel tank 34 to the combustor 20, in which the fuel is combusted in the presence of air, oxygen, or other oxidizer. Since the same working fluid is used for both cycles 12, 14, a single condenser 26 can be used for both cycles.

It will be appreciated that several components of the system 10 are, in effect, heat-exchangers. Heat-exchanging components include, for example, the boiler 22, the evaporator 30, and the condenser 26, as well as the regenerator 24.

In the system 10 shown in FIG. 1, the working fluid (condensed into a liquid by the condenser 26) is split into two streams. A first stream 36 enters the refrigeration cycle 14 via the throttling valve 32, and a second stream 38 enters the power cycle 12 via the pump 28. In the power cycle 12, as in a Rankine cycle, the condensed working fluid is delivered at elevated pressure by the pump 28 through the regenerator 24 to the boiler 22 where the liquid working fluid is heated (using heat generated in the combustor 20), desirably at substantially constant pressure, to form a superheated vapor of the working fluid. The superheated vapor expands (ideally adiabatically and isentropically) in the expander 16 that generates a work output ("$W_{out}$") from the expansion. Expansion of the working fluid in the expander 16 decreases the temperature and pressure of the vapor, but the vapor is still capable of surrendering heat, in the regenerator 24, to the working fluid being urged by the pump 28 into the boiler 22. The vapor passes through the regenerator 24 to the condenser 26 where the vapor is converted to a saturated liquid as the working fluid gives off heat. The saturated liquid reenters the pump 28 and the cycle repeats.

In the power cycle 12, as the working fluid passes from the pump 28 through the regenerator 24, heat is added to the working fluid before the working fluid returns to the boiler 22. The added heat is supplied by the regenerator 24 directly from heat removed by the regenerator 24 from the vapor exiting the expander 16. Thus, the regenerator 24 is effectively a heat-exchanger, in which heat recovery from the expanded working fluid increases the efficiency with which the working fluid is superheated, thereby providing the system 10 with a higher overall cycle efficiency compared to conventional systems. If the regenerator 24 were not included in the system 10, the excess heat remaining in the expanded working fluid (exiting the expander 16) would not be recovered, resulting in reduced performance of the system.

In the depicted system 10, the expanded working fluid (from the expander 16) exiting the regenerator 24 is combined with the working fluid of the refrigeration cycle 14, specifically with the compressed working fluid exiting the compressor 18. The combined stream of saturated vapor at elevated pressure is routed to the condenser 26, which converts the vapor working fluid into liquid, producing heat. (It is possible to provide a second regenerator in the refrigeration cycle 14 to recover at least some of this heat from the working fluid and to transfer the recovered heat to working fluid entering the boiler 22.) Exit of the working fluid from the condenser 26 completes both the power cycle 12 and the refrigeration cycle 14. The work output by the expander 16 is input directly to the compressor 18 to drive the compressor in the refrigeration cycle 14.

In the refrigeration cycle 14, liquid working fluid from the condenser 26 passes through the throttling valve 32, which reduces the pressure of the liquid. The reduced-pressure liquid enters the evaporator 30, in which the liquid is converted to a vapor, which substantially reduces the temperature of the working fluid. Thus, the evaporator 30 achieves net movement of heat to the working fluid as the pressure of the working fluid is maintained at saturation conditions by the compressor 18.

The system 10 also includes "balance of plant" components. For example, the system 10 includes means for driving the pump 28, means for urging flow of air into the combustor 20, and means for urging flow of air through the condenser 26. The means for driving the pump 28 can be any of various devices utilizing a portion of the work output from the expander 16, for example, a direct-drive or other coupling to a rotating expander shaft. The respective means for urging flow of air can be respective fans or the like, again utilizing respective portions (which would be very small) of the work output from the expander 16. Balance of plant can include, if necessary, means for urging flow of fuel from the fuel tank 34 to the combustor 20.

Expansion of the working fluid in the evaporator 30 converts the working fluid from a reduced-pressure liquid to a reduced-pressure vapor, which is accompanied by a substantial decrease in temperature (cooling) of the working fluid. This cooled working fluid can be used to chill a coolant fluid such as water. Hence, the system 10 also desirably includes a cycle 40 by which heat is drawn from the coolant fluid in the evaporator 30 and is circulated to a "cooling zone" for cooling purposes. In the cycle 40, the evaporator 300 effectively serves as a heat-exchanger that achieves transfer of heat from the coolant fluid to the working fluid. The resulting chilled coolant fluid in the cycle 40 is circulated from the evaporator 30 to a "cooling zone" 42 of a thing 43 to be cooled. An example cooling zone 42 is in or on a cooling vest ("water chest") 3v that can be, for example, worn around the chest of a person 43p in the manner of a part of a suit of clothing. As the coolant fluid circulates in the cooling zone 42 of the cooling vest 3v, the coolant fluid removes heat from the body of the person 43p and thus cools the person 43p. The heat thus acquired by the coolant fluid subsequently is removed by passing the coolant fluid through the evaporator 30. The cycle 40 can include a small pump (not shown) used for circulating the coolant fluid through the cooling vest 3v and evaporator 30. Alternatively to a cooling vest 43v or the like, the cooling zone 42 can be a heat-exchanger used for cooling air in a vehicle 43c, wherein the air in the vehicle is circulated so as to flow past the cooling zone.

In the depicted system 10, the expander 16 and compressor 18 are effectively integrated, and the integrated expander/compressor is key to achieving overall system efficiency due to, inter alia, less flow resistance, less heat loss, and greater mechanical efficiency in the integrated configuration. An exemplary integrated expander/compressor exhibits an isentropic efficiency of at least 70%. Also effectively integrated are the boiler 22 and combustor 20; in the integrated configuration heat produced in the combustor is transferred directly and with minimal loss to the working fluid in the boiler.

At least one (preferably more than one) of the heat-transfer (heat-exchange) components (e.g., the boiler 22, the evaporator 30, the condenser 26, and the regenerator 24) desirably is configured microtechnologically for high thermal efficiency, compactness, and low mass. Examples of microtechnology-based configurations include, but are not limited to, thin-walled microfluidic channels and/or microtubules. Components having such configurations allow the weight and size of the system 10 to be reduced substantially over a conventional heat-pump system.

Figure 40:
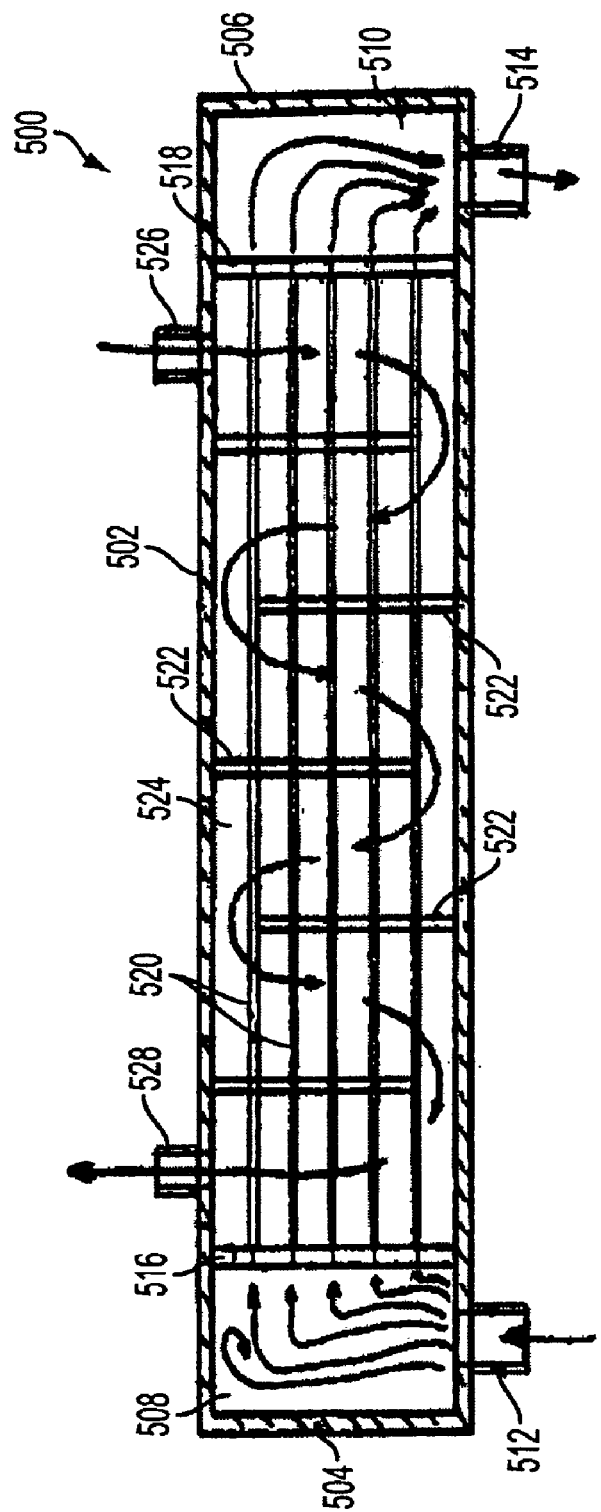
FIG. 40 is a schematic diagram of a representative microtubule-based configuration that can be used for any of the several heat-exchanger components of the heat-pump system.

An exemplary microtubule-based configuration 500 that can be used for any of various heat-exchangers of the system 10 is shown in FIG. 40, which depicts a housing 502 having a first end 504 and a second end 506 defining respective end-chambers 508, 510. The first end-chamber 508 has an inlet port 512, and the second end-chamber has an outlet port 514. The first end-chamber is bounded by a barrier 516, and the second end-chamber is bounded by a barrier 518. Microtubules 520 are mounted to and extend between the barriers 516, 518 such that first ends of the microtubules 520 are attached to the barrier 516, and second ends of the microtubules are attached to the barrier 518. The microtubules 520 are attached to the barriers 516, 518 such that the lumina of the microtubules extend through the barriers and open into the respective end-chambers 508, 510. A stream of the working fluid enters the first chamber 508 via the inlet port 512 and enters (note arrows) the lumina of the microtubules 520. The working fluid thus flows in parallel through the microtubules 520 from the first end-chamber 508 to the second end-chamber 510, and exits the second end-chamber through the outlet port 514. In a middle chamber 524 (also termed a "shell") of the housing, between the barriers 516, 518, are mounted baffles 522 arranged in a staggered arrangement. The middle chamber has an inlet port 526 and an outlet port 528 (depicted for counter-current flow). A fluid intended to undergo heat-exchange with the working fluid enters the middle chamber 524 via the inlet port 526, flows through the middle chamber in a convoluted path dictated by the baffles 522, and exits via the outlet port 528. Meanwhile, thermal exchange between the two fluids occurs across the walls of the microtubules 520.

The microtubule-based configuration 500 shown in FIG. 40 can be used, for example, as an integrated boiler 22 and combustor 20, in which hot gases produced by fuel combustion are produced in, or otherwise flow through, the middle chamber 524 spanned by the microtubules 520. As working fluid passes through the lumina of the microtubules 520, the working fluid readily absorbs heat, transferred quickly across the microtubule walls, from the hot combustion gases in the middle chamber 524. The microtubules in such a configuration are made of a suitable metal or ceramic material capable of withstanding combustion conditions while providing high thermal conductivity across their walls.

In an alternative microtubule-based configuration of an integrated boiler/combustor, the hot combustion gases flow through the lumina of the microtubules 520 as the working fluid flows through the middle chamber ("shell") 524. This configuration may be advantageous for certain applications since its comparatively "open" flow arrangement afforded by the shell allows vaporization to proceed without flash points that otherwise would tend to "spit" out both liquid and vapor if occurring in the confines of small-diameter tubes. This alternative configuration is especially advantageous in microscale boilers having a microtubule configuration.

An exemplary microfluidic-channel configuration that can be utilized (as an alternative to the microtubule-based configuration) is any of the microchannel configurations now making their debut for use in actively cooling microprocessor chips. Microchannels can be formed in a substrate by any of various MEMS or other microfluidic-fabrication techniques currently available, by which channels, conduits, through-cuts, and any of various other machine shapes and voids are formed. The microchannels desirably are separated from each other by thin walls, and fluids are passed through opposing microchannels by, e.g., countercurrent flow as thermal exchange between the fluids occurs across the intervening walls. Two-dimensional arrays of microchannels can be formed by existing MEMS technology in laminar substrates, and three-dimensional arrays of microchannels can be formed by bonding the laminae together. Examples of applicable microchannel technology can be found in U.S. Pat. Nos. 6,892,802, 5,932,940, 5,749,226, and 5,811,062, all incorporated herein by reference.

Another exemplary use of microtubules and/or microchannels is in the regenerator 24. In a regenerator configured with microtubules, for example, liquid working fluid from the pump 18 can be directed through the lumina of a bundle of microtubules 520 spanning a middle chamber 524 traversed by hot working-fluid vapor from the expander 16. As the liquid working fluid passes through the microtubules 520, the working fluid readily absorbs heat, transferred quickly across the microtubule walls, from the working-fluid vapor that has exited the expander 16.

With respect to the system 10, it is desirable to keep expansion spaces (e.g., cylinders, pistons, and conduits for the working fluid) at the temperature of the working fluid during operation. It also is desirable to minimize, to the best extent possible, heat leakage to ambient-temperature regions of the system 10 or to the ambient surroundings of the system 10. Such thermal management can be achieved by judicious application and use of insulation, such as around the expander 16 and around other "hot" sections of the system, and/or use of materials having low thermal conductivity. Thermal insulation also can be achieved using vacuum-gap technology.

The system embodiment shown in FIG. 1 has particular utility as a heat pump (heat-activated cooling system) usable, for example, as a cooling system for a protective suit worn by a person, a cooling system for a vehicle, or as a waste-heat-recovery system. The system 10 has been evaluated both with and without the regenerator 24 situated between the pump 28 and boiler 22. As noted above, including the regenerator 24 allows effective recovery of heat left in the expanded working fluid (superheated in the boiler 22) exiting the expander 16. Herein, a system 10 including the regenerator 24 is regarded as including a "heat-recovery" cycle. A system lacking the regenerator 24 is regarded as a "basic cycle." Thus, the regenerator 24 is a heat-exchanger, i.e., a heat-recovery component.

Any of various working fluids can be used with the system 10, and a suitable working fluid for a particular application of the system will involve considerations of environmental issues, flammability, toxicity, and the like. The selection can be made from several general classes of working fluids commonly used in refrigeration. A first general class is hydrocarbons, including propane (R290), isobutane (R600a), n-butane (R600), cyclopropane (RC270), ethane (R170), n-pentane (R601), and isopentane (R601a). A concern with this first class is the flammability of the compounds; on the other hand, they have no adverse effect on the earth's ozone layer, are not generally implicated in global warming, and have low environmental impacts in production. A second general class is chlorohydrocarbons (e.g., methyl chloride (R40)). A third general class is chlorofluorocarbons (e.g., trichlorofluoromethane (R11), dichlorodifluoromethane (R12), monofluorodichloromethane (R21), and monochlorodifluoromethane (R22), and trichlorotrifluoroethane (R113), as well as R114, R500, and R123 (or HCFC-123)). A concern with the second and third classes is the adverse effect of these compounds, when released into the environment, on the earth's ozone layer. A fourth general class is fluorohydrocarbons (e.g., tetrafluoroethane (R134a), pentafluoroethane (R125), R502, R407C, R410, and R417A, and HFE-7000). A fifth general class is other compounds such as ammonia (R717), sulfur dioxide (R764), and carbon dioxide. Benefits of the fluorohydrocarbons are their inertness and non-flammability. Some of these compounds currently have environmental and/or toxicity concerns associated with them. Another class of working fluids that may be advantageous for some uses is nanofluids.

Computational Model of Heat-Pump System

Exemplary operating conditions of the system 10 are set forth in Table 1.

TABLE 1

Operational Parameters

| | Value |
|---|---|
| A. Input Parameter: | |
| Evap'r Cooling Load ($Q_{in}$) | 150 W |
| Evaporator Temp ($T_{evap}$) | 7° C. (280 K) |
| Evaporator Pressure ($P_{evap}$) | 46 kPa |
| Condenser Temp ($T_{con}$) | 40° C. (313 K) |
| Condenser Pressure ($P_{con}$) | 150 kPa |
| Boiler Pressure ($P_{boi}$) | 1000 kPa |
| Boiler Temperature ($T_{boi}$) | 116° C. (389 K) |
| Expander Isentropic Efficiency ($\eta_e$) | 0.8 |
| Compressor Isentropic Efficiency ($\eta_c$) | 0.9 |
| Regenerator Effectiveness | 0.9 |
| Total fluid-transfer rate (m) | $9.28 \times 10^{-4}$ kg/s |
| B. Output Parameter: | |
| Heat-pump COP | 0.95 |
| Boiler heat output ($Q_{boi}$) | 159 W |
| Condenser heat output ($Q_{con}$) | 309 W |
| Regen'r heat output ($Q_{reg}$) | 21 W |
| Expander work output ($W_{exp}$) | 22 W |
| Pump work output ($W_{pump}$) | 0.6 W |
| Boiler mass transfer ($m_1$) | $4 \times 10^{-4}$ kg/s |
| Evap'r mass transfer ($m_7$) | $5.28 \times 10^{-4}$ kg/s |
| System weight | 1.7 kg |

In this example, the cooling load of $Q_{in}$=150 Watts and the evaporator temperature $T_{evap}$=7° C. were established by requirements posed by an effective cooling system for a protective suit worn by a person in a temperate climate. The temperature of the condenser $T_{con}$ was determined by the anticipated temperature of surrounding air and the required difference of temperature of the condenser 26 compared to the surrounding air. Thus, in Table 1, a stated exemplary condenser temperature of $T_{con}$=40° C. was selected.

For high performance in a miniature cooling system, the expander 16 and compressor 18 were integrated together and each provided with a piston-based configuration. This configuration was suitable for a moderate-pressure cooling system in which the working fluid has vapor-pressure characteristics similar to those of isopentane and various fluorocarbons.

In this computational model the working fluid was isopentane, and the evaporator 30 and the condenser 26 were regarded as operating under saturation conditions at respective pressures of $P_{evap}$=46 kPa and $P_{con}$=150 kPa. Based on these operating pressures, the compression ratio required for the compressor 18 was $P_{con}/P_{evap}$=(150 kPa)/(46 kPa)=3.26. Also, based on the working-fluid conditions as well as mechanical and material considerations for the integrated expander/compressor, an exemplary inlet pressure of the expander 16 was established at $P_{boi}$=1000 kPa, which established an expansion ratio of $P_{boi}/P_{evap}$=(1000 kPa)/(150 kPa)=6.67. At $P_{boi}$=1000 kPa and $T_{boi}$=116° C., the boiler 22 operates at saturation conditions. The stated isentropic efficiencies of the expander 16 and compressor 18 (i.e., $\eta_e$=0.8 and $\eta_c$=0.9) were based on preliminary test results. For a system 10 including a regenerator 24, the efficiency of the regenerator was set at 0.9 to recover most of the available heat in the expanded working fluid exiting the expander 16.

Figure 2:
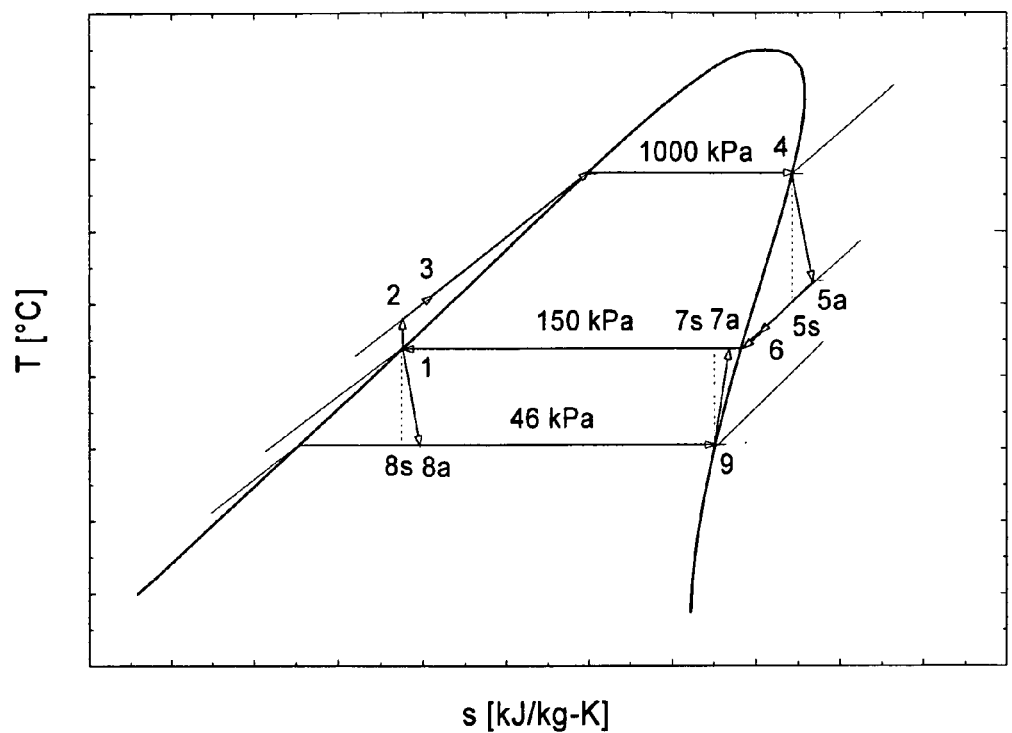
FIG. 2 is a T-S diagram for the system of FIG. 1, according to the conditions set forth in Table 1. The T-S diagram includes respective portions for the power cycle and the refrigeration cycle.

The conditions set forth in Table 1 produced a cycle T-S diagram as shown in FIG. 2. The T-S diagram included respective portions for the power cycle 12 and the refrigeration cycle 14. The power cycle 12 comprised the following portions:

path 1-2: isentropic compression of the working fluid in the pump 28 path 2-3: heat addition to the working fluid in the regenerator 24 path 3-4: heat addition to the working fluid in the boiler 22 path 4-5a: expansion of the working fluid in the expander 16 path 5a-6: rejection of heat from the working fluid in the regenerator 24 path 6-1: rejection of heat from the working fluid in the condenser 26

The refrigeration cycle 14 comprised the following portions:

path 1-8a: throttling the working fluid through the throttling valve 32 path 8a-9: absorption of heat from the working fluid in the evaporator 30 path 9-7a: compression of the working fluid in the compressor 18 path 7a-1: rejection of heat from the working fluid in the condenser 26

The working-fluid vapor exiting the expander 16 remains superheated even though the regenerator 24 removes some heat from the working fluid. The respective working-fluid streams from the power cycle 12 and refrigeration cycle 14 combine at 7a in FIG. 2 and then undergo condensation in the condenser 26, which removes heat from the fluid. Using isopentane as the working fluid, compression of the fluid yields some condensation of the fluid. According to the T-S diagram, a slight superheating of the "refrigerant" working fluid would avoid such condensation. Slight superheating could be accomplished by including a regenerator within the refrigeration cycle 14.

To assess the influence of each component on the overall performance of the system 10, a thermodynamic model was developed using EES ("Engineering Equation Solver," available from F-chart Software, Madison, Wis.) as a data base and equation solver. This computation package provided all of the thermodynamic and transport properties needed for the working fluid. To simplify the thermodynamic model, the following assumptions were made: (1) the system operated under steady-state conditions; (2) pressure drops in the boiler 22, regenerator 24, evaporator 30, and condenser 26 and in the connecting conduits were negligible; (3) heat losses from all the components (except the condenser 26) to the ambient environment were negligible; (4) the temperature rise across the liquid pump 28 was negligible; (5) the fluid enthalpy did not change across the throttling valve 32; and (6) the work output by the expander 16 equaled the work input to the compressor 18.

In the model, the Martin-Hou equation of state was used with respect to the working fluid to determine unknown thermodynamic properties. Based on the operating conditions listed in Table 1 for the major components in the system 10, two sets of equations were formulated for the power cycle and the refrigeration cycle. To complete the overall heat-pump cycle, three additional equations were used to couple the two cycles together:

$$\dot{m}_{tot} = \dot{m}_p + \dot{m}_r \quad (1)$$

$$P_{exp} = P_{com} \quad (2)$$

$$W_{exp} = W_{com} \quad (3)$$

in which:
$\dot{m}_{tot}$=total mass-flow rate
$\dot{m}_p$=mass-flow rate in the power cycle 12
$\dot{m}_r$=mass-flow rate in the refrigeration cycle 14
$P_{com}$=outlet pressure of the compressor 18
$P_{exp}$=outlet pressure of the expander 16
$W_{com}$=work input to the compressor 18
$W_{exp}$=work output by the expander 16

The model yielded calculations of the heat input to, and heat output from, the system 10 based on the total mass-flow rate $\dot{m}_{tot}$. Then, the coefficient of performance (COP) of the overall system 10 was calculated from Equations (4) and (5), below. Equation (4) applied to a "basic" cycle lacking the regenerator 24, and Equation (5) applied to a cycle ("heat-recovery cycle") including the regenerator.

$$COP_{bas} = \frac{Q_{eva}}{Q_{boi} + W_{pump}} \quad (4)$$

$$COP_{reg} = \frac{Q_{eva}}{Q_{boi} - Q_{reg} + W_{pump}} \quad (5)$$

in which:
$COP_{bas}$=coefficient of performance of the basic cycle
$COP_{reg}$=coefficient of performance of the heat-recovery cycle
$Q_{boi}$=heat input to the boiler 22
$Q_{eva}$=heat input to the evaporator 30
$Q_{reg}$=heat exchanged in the regenerator 24
$W_{pump}$=work input to the pump 28

For a particular cooling-system design, the cooling load of (heat input to) the evaporator 30, $Q_{eva}$, was a key parameter that determined the total mass-flow rate ($\dot{m}_{tot}$) of the working fluid for the prescribed operating conditions. This parameter also determined the needed heat input ($Q_{boi}$) in the boiler 22, which in turn determined the heat rejected in the condenser 26. As shown in FIG. 1, heat input to the boiler 22 is supplied by hot gases produced by combustion of fuel. By configuring the boiler 22 using microtechnology-based structures (e.g., microchannels and/or microtubules), the boiler can be provided with high heat-transfer effectiveness. In the following cycle cases, heat loss via combustion exhaust was not used to determine the overall system COP.

As noted previously, the basic cycle is similar to that shown in FIG. 1, but lacks a regenerator 24. In the basic cycle, liquid working fluid exiting the pump 28 enters the boiler 22 directly without being preheated. Working-fluid vapor exiting the expander 16 is conducted directly to the condenser 26 without being subjected to heat recovery. For a cooling load of $Q_{in}$=150 W in the evaporator 30, the total mass-flow rate of working fluid for the entire cycle ("measured" at the outlet from the condenser 26) is 0.93 g/s, whereas the mass-flow rates for the power cycle 12 and refrigeration cycle 14 are 0.4 g/s and 0.53 g/s, respectively. The heat input to the boiler 22 is 179 W and the heat rejection by the condenser 26 to the cooling air is 329 W. Therefore, the overall COP of the heat-pump system configured according to the basic cycle is 0.83.

An exemplary system 10 providing heat-recovery (due to the presence and use of the regenerator 24) is shown in FIG. 1. For the same cooling load of 150 W in the evaporator 30, the mass-flow rates are the same as in the basic cycle. However, with the effectiveness of the regenerator 24 being 0.9, heat input to the boiler 22 is reduced to 159 W, and heat rejection by the condenser 26 is correspondingly reduced to 309 W. As a result, due to use of the regenerator 24, the overall COP of the system 10 is increased to 0.96. Although including the regenerator 24 adds system complexity, the thermodynamic performance of the system is increased significantly. The regenerator 24 also has additional benefits that impact respective configurations of the condenser 26 and boiler 22.

Figure 3:
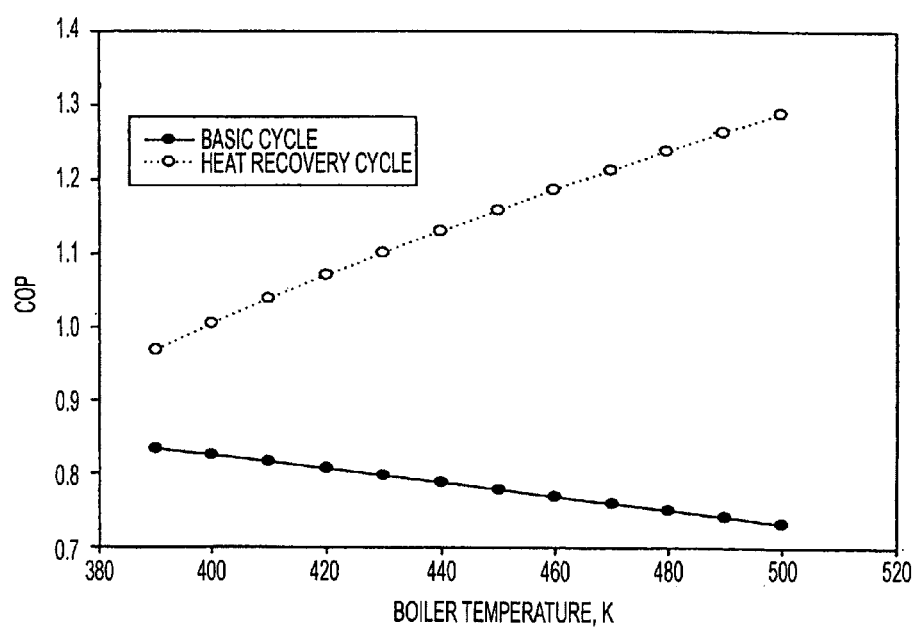
FIG. 3 is a plot, for the system of FIG. 1, of coefficient of performance (COP) versus boiler temperature, revealing the effect of the regenerator on the COP of the total system whenever the pressure of the boiler remains at 1000 kPa and superheat is increased from zero (at a boiler temperature of 116° C.) to 227° C.

Further computations demonstrated that overall system performance was further improved by using a regenerator 24 whenever the working fluid is superheated. FIG. 3 shows the effect of the regenerator 24 on the COP of the total system whenever the pressure of the boiler 22 remains at 1000 kPa and superheat is increased from zero (at a boiler temperature of 116° C.) to 227° C.

To optimize system performance, investigations were made of the influence of operating conditions for each component. Since the system 10 can be used advantageously for any of various portable-cooling applications, overall system weight can be a major consideration for system design. For example, the lower the temperature of the condenser 26, the higher the COP of the cycle; but, reducing its temperature makes the condenser larger (and heavier) due to a lower ΔT relative to the ambient environment. A heavier condenser 26 can be disadvantageous for certain types of portable cooling systems. On the other hand, increasing the temperature of the condenser 26 to reduce the condenser weight causes the COP of the refrigeration cycle 14 to decrease. To consider this effect, and to investigate the consequences of changing isentropic efficiencies of the expander 16 and compressor 18, the temperature of the boiler 22, the temperature of the condenser 26, and the temperature of the evaporator 30, trade-off studies were conducted.

Superheating the working fluid in the boiler 22 can have a significant impact on system performance. A system lacking a regenerator 24 has an overall COP that decreases with increasing superheat of the working fluid because the cooling capacity of the evaporator 30 increases more slowly than the heating requirement for the boiler 22. On the other hand, in a system including a regenerator 24, the overall system COP increases with increasing superheat of the working fluid because the regenerator 24 recovers most of the extra heat input to the working fluid in the boiler 22. These trends are clearly shown in FIG. 3, in which the overall COP of the system increases almost 40 percent over a 100 K increase of superheat in the boiler 22 at 1000 kPa. Due to the significant improvement of performance of a system 10 including a regenerator 24 for heat recovery, the parameters of such a system that included a combined (integrated) expander/compressor were further evaluated. A "combined" or "integrated" expander/compressor is a component in which the expander 16 and compressor 18 are brought together, such as in a single housing in which certain moving parts of the expander and compressor are coupled to a single shaft.

Figure 4:
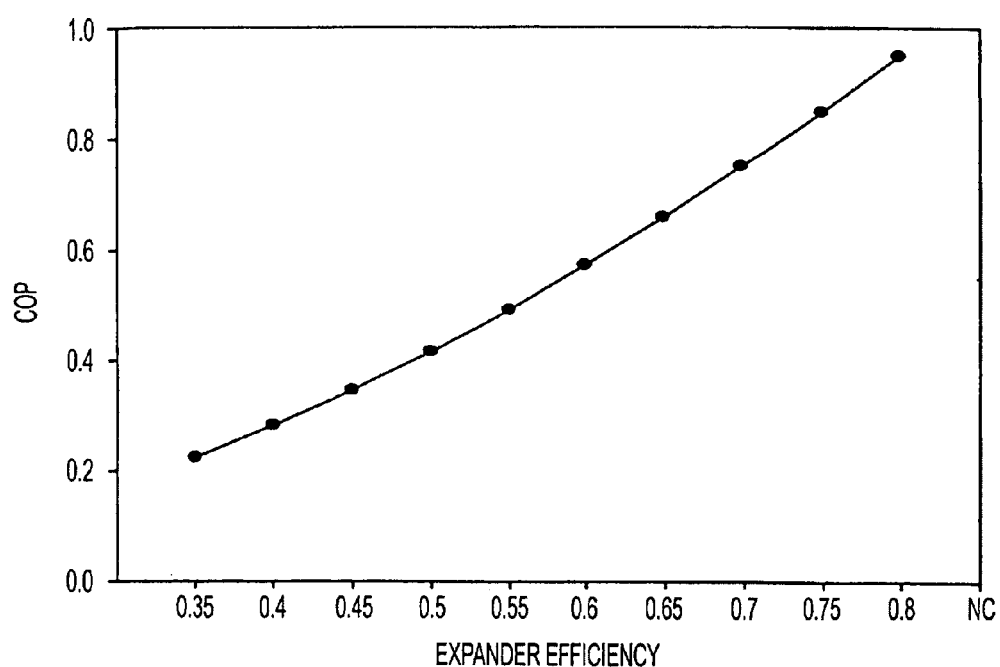
FIG. 4 is a plot, for the system of FIG. 1, of COP versus expander efficiency, showing that the COP decreases almost linearly with a corresponding decrease in expander efficiency.

As a key component in the system 10, the performance of the integrated expander/compressor significantly impacts the system COP. As shown in FIG. 4, the COP of the system 10 decreases almost linearly with a corresponding decrease in efficiency of the expander 16. The depicted curve was generated by starting with baseline values of 80% and 90% isentropic efficiencies for the expander 16 and compressor 18, respectively, and by decreasing the efficiency of the expander while keeping the compressor efficiency equal to expander efficiency plus 0.1.

Figure 5:
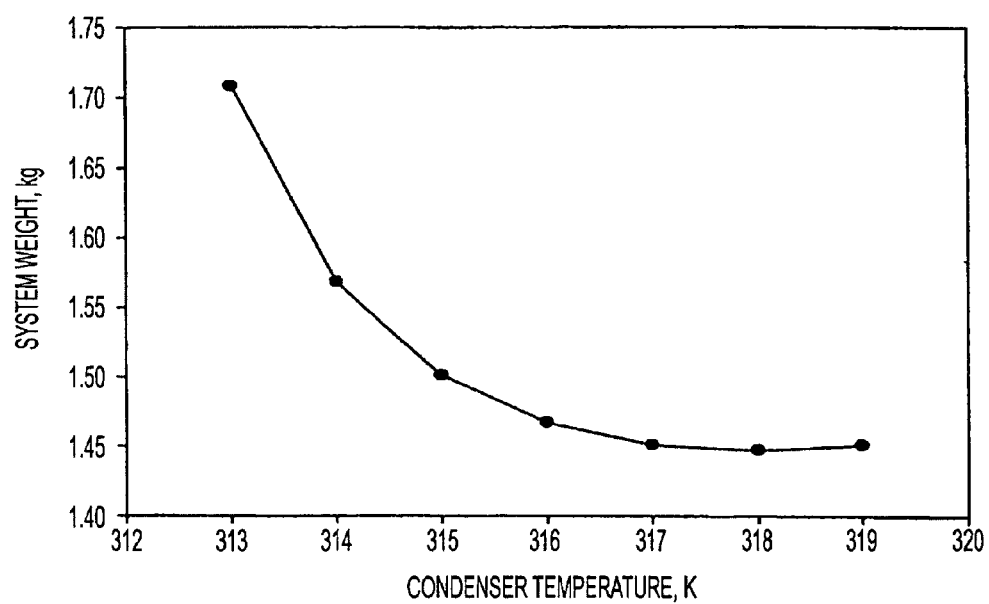
FIG. 5 is a plot, for the system of FIG. 1, showing the relationship of system weight to condenser temperature.
Figure 6:
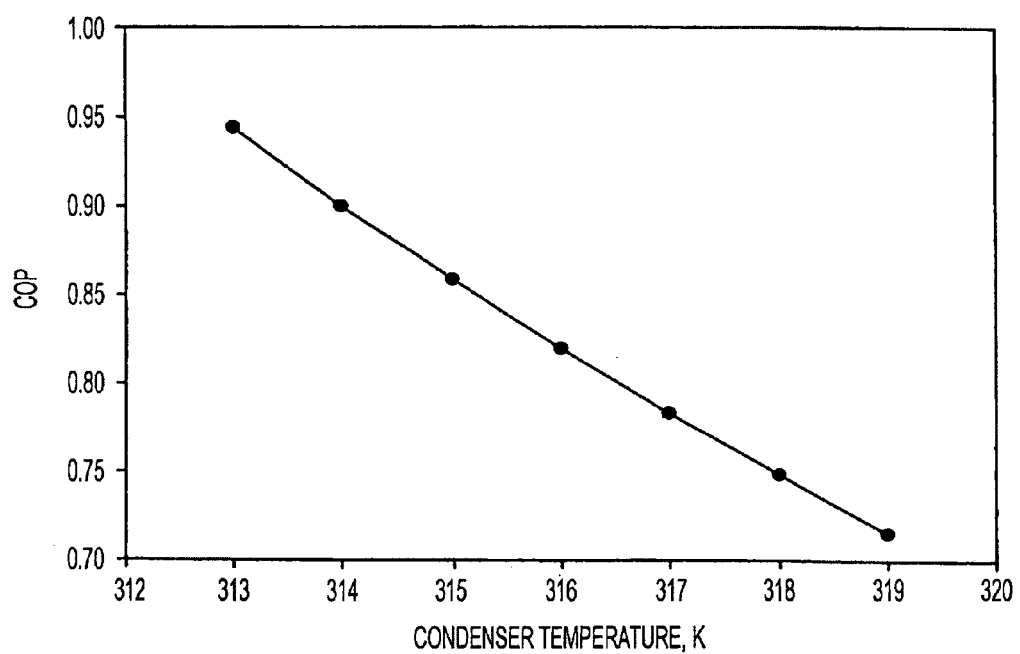
FIG. 6 is a plot, for the system of FIG. 1, showing the relationship of COP to condenser temperature.

Increasing the fluid-condensing temperature dramatically decreases the mass of the condenser 26 due to the increase of the log mean temperature difference (LMTD) of the condenser. But, this decrease in the mass of the condenser 26 is accompanied by a corresponding decrease in system COP. In a trade-off study of condenser temperature versus system weight, optimal operating temperatures for the condenser 26 (taking into consideration system weight and performance) were determined. In the trade-off study, the system weight is the total weight of the overall system 10. System weight includes the respective masses of all the components shown in FIG. 1 plus a cooling fan (not shown) for the condenser 26. FIGS. 5 and 6 show the effects on system weight and COP, respectively, accompanying increases in temperature of the condenser 26.

Figure 7:
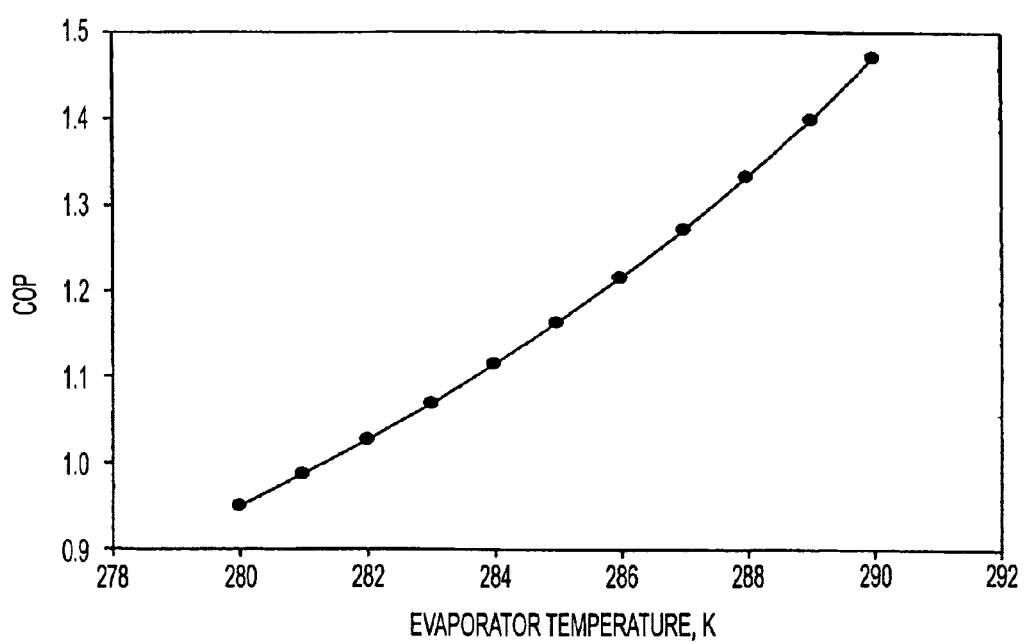
FIG. 7 is a plot, for the system of FIG. 1, showing the influence of evaporator temperature on the overall system COP.

An increase in size of the evaporator 30 accompanies an increase in the evaporator temperature. Under such conditions, both the heat of vaporization and the fluid mass-flow rate in the refrigeration cycle 14 increase, yielding substantial increases in the cooling capacity of the evaporator 30. FIG. 7 shows the influence of evaporator temperature on the overall system COP. For example, a 5-degree increase in the evaporation temperature yields an increase of 20 percent in the overall system COP.

Thus, the thermodynamic model revealed that a system 10 including heat recovery (using at least one regenerator 24) exhibited significantly better performance than a system lacking a regenerator, especially whenever the working fluid in the boiler 22 is superheated. Overall system COP increased almost 40 percent with 100 degrees of superheat in the boiler 22. A further improvement of 20% could be realized if the evaporator temperature were increased from, for example, 7° C. to 12° C. Overall system COP dropped approximately linearly with corresponding decreases in the respective efficiencies of the expander 16 and compressor 18. Although overall system COP also dropped linearly with increasing condenser temperature, the accompanying effect of reducing overall system size and weight was regarded as beneficial for certain uses of the system.

First Representative Embodiment of Expander

The expander embodiment described below is advantageously used in small, compact heat-pump systems such as a system used for cooling a personal protective suit.

The expander of this embodiment converts thermal energy, added to the working fluid in the boiler, into shaft work used for driving the compressor and optionally other components of the heat-pump system. In this embodiment, the expander has a piston configuration, in which the pistons are disposed in respective "cylinders." Each cylinder includes a respective inlet valve and a respective "exhaust" (outlet) valve.

With respect to the expander, FIGS. 8(a)-8(c) schematically show an exemplary piston disposed in its respective cylinder 52. The cylinder 52 includes a cylinder head 54 in which an inlet valve 56 and an exhaust valve 58 are mounted. FIGS. 8(a)-8(c) depict three respective steps of a piston cycle. The piston cycle includes one downward "stroke" and one upward "stroke" of the piston 50 in the cylinder 52. FIG. 8(a) depicts the start of a downward stroke, in which the piston 50 is at top-dead-center (TDC), the exhaust valve 58 is closed, and the inlet valve 56 is open, which allows working-fluid vapor to enter the cylinder 52. This intake of vapor into the cylinder 52 is isobaric. In FIG. 8(b), when the piston 50 has traveled about 30% of the downward stroke, the inlet valve 56 closes, which initiates an expansion of the vapor in the cylinder 52. Expansion continues with further downward movement of the piston 50 to its bottom-dead-center (BDC) position in the cylinder 52 (FIG. 8(c)). At BDC, the exhaust valve 56 opens to discharge the expanded vapor from the cylinder 52 as the piston 50 returns via an upward stroke to the TDC position. To avoid flow-through in the cylinder 52 from the inlet valve 56 directly to the exhaust valve 58, the exhaust valve can be closed just before the piston 50 reaches TDC, which causes a slight compression of vapor remaining in the cylinder. (Technically, this would constitute a fourth and final step before TDC, but the impact on the cycle work would be small.)

Turning to FIG. 9(a), this expander embodiment 60 comprises two pistons 50a, 50b each situated in a respective cylinder 52a, 52b. By way of example, each piston has a diameter of 0.5 inches and a stroke of 0.48 inches, yielding a total displacement of $2\pi(0.48)[(0.5)/2]^2 = 0.189$ in$^3$ (for both cylinders) in the expander 60. Each piston 50a, 50b is coupled by a respective rod 62a, 62b and bearing 64a, 64b to a shaft 66. Each cylinder 52a, 52b includes a respective inlet valve 56a, 56b and respective exhaust valve 58a, 58b. Fixed valve timing provides a volume-expansion ratio of 3.1 in each cylinder 52a, 52b. Movement of the pistons 50a, 50b in the respective cylinders 52a, 52b is 180° out of phase (i.e., as one piston undergoes a downward stroke, the other piston undergoes an upward stroke; when one piston is at TDC, the other piston is at BDC).

The pistons 50a, 50b are coupled to the shaft 66 by a kinematic linkage, as noted above, comprising connecting rods 62a, 62b and bearings 64a, 64b. The bearings are mounted on respective eccentric disks on the shaft 66. The bearings and eccentric disks reduce frictional effects during rotation of the shaft 66. If significant side loads are present in the motion of the pistons, low-friction material can be used on the sides of the pistons to reduce parasitic effects during operation.

Figure 9B:
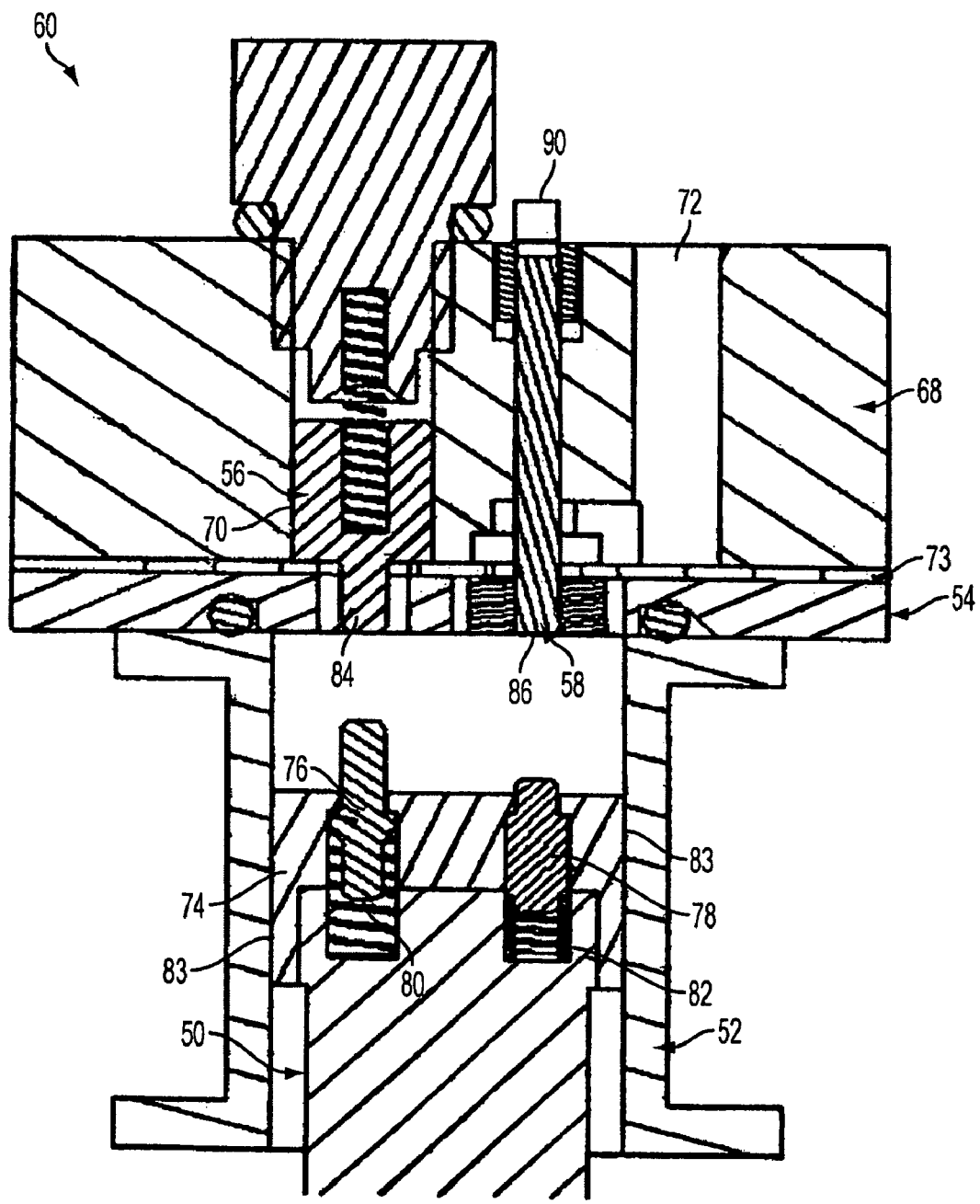
FIG. 9(b) is an elevational section depicting certain details of the upper portion of a piston, cylinder, cylinder head, inlet valve, and exhaust valve of the first representative embodiment of the expander.

FIG. 9(b) depicts further detail of the upper portion of a piston 50, cylinder 52, cylinder head 54, inlet valve 56, and exhaust valve 58 of the expander 60. The cylinder 52 and piston 50 can be made of any suitable rigid material capable of withstanding exposure to the working fluid under the temperature and pressure conditions encountered in the expander 60. In this embodiment the cylinder 52 and piston 50 are made of an aluminum bronze for wear-resistance and low friction. The cylinder head 54 in this embodiment is made of a 0.090-inch thick aluminum plate. Between the cylinder head 54 and cylinder 52 is an elastomeric seal (O-ring) 55. Mounted to the cylinder head 54 is a valve block 68 made, e.g., of a rigid polymer such as Delrin or of metal. The valve block 68 defines an inlet passage 70 and an exhaust passage 72 extending to the cylinder head 54. Situated between the cylinder head 54 and valve block 68 is an elastomeric (e.g., silicone) gasket 73 that forms a seal between the cylinder head and valve block and serves as a seat material for the valves 56, 58. Attached to the top of the piston 50 is a cap 74 that houses two spring-loaded tappets 76 (for the inlet valve 56), 78 (for the exhaust valve 58). Note respective springs 80, 82. The cap 74 also defines a running surface 83 for the piston 50 in the cylinder 52.

The inlet valve 56 and exhaust valve 58 include respective spring-loaded poppets 84, 86 that are situated and configured to engage the respective tappets 76, 78. Engagement of a tappet 76, 78 with a respective poppet 84, 86 actuates the respective valve 56, 58. Thus, actuation of the valves 56, 58 relies upon and is synchronized with the motion of the piston 50. Because of its simplicity and inherent valve-timing characteristic, this configuration is effectively used in miniaturized expanders.

In this embodiment the inlet tappet 76 first contacts the inlet poppet 84 on the return stroke when the piston 50 is at about 30% of the stroke from top-dead-center (TDC). The spring 80 associated with the inlet tappet 76 is selected such that its spring constant, upon compression, cannot overcome the pressure difference across the closed inlet valve 56. This allows the tappet spring 80 to compress while the inlet valve 56 remains closed. Just before TDC, the inlet tappet 76 encounters a hard-stop that prevents further compression of the spring 80 and pops the inlet valve 56 open. With the pressure difference across the inlet valve 56 thus relieved, the tappet spring 80 pushes the inlet valve 56 fully open and holds it open until the piston 50 has moved down the downward stroke sufficiently to fully extend the inlet tappet 76. As the piston 50 moves further on the downward stroke, a spring 88 associated with the inlet poppet 84 (this spring 88 is "softer" than the tappet spring 80) closes the inlet valve 56.

The exhaust valve 58 is actuated by the exhaust tappet 78 that pushes the exhaust-valve poppet 86 to its closed position just before the inlet tappet 76 reaches its hard-stop. The spring 82 associated with the exhaust tappet 78 absorbs the small amount of interference between the exhaust tappet 78 and the exhaust poppet 86. A rocker arm 90 (the end of the rocker arm 90 is shown) contacts the top end of the exhaust poppet 86 of the depicted cylinder 52 as well as the top end of the exhaust poppet of the second cylinder (not shown) of the expander. Thus, the rocker arm 90 couples the respective exhaust valves 58 to each other in a manner ensuring their actuation 180° out of phase with each other during operation of the expander; when one exhaust valve 58 is closed, the other exhaust valve is open.

Figure 10:
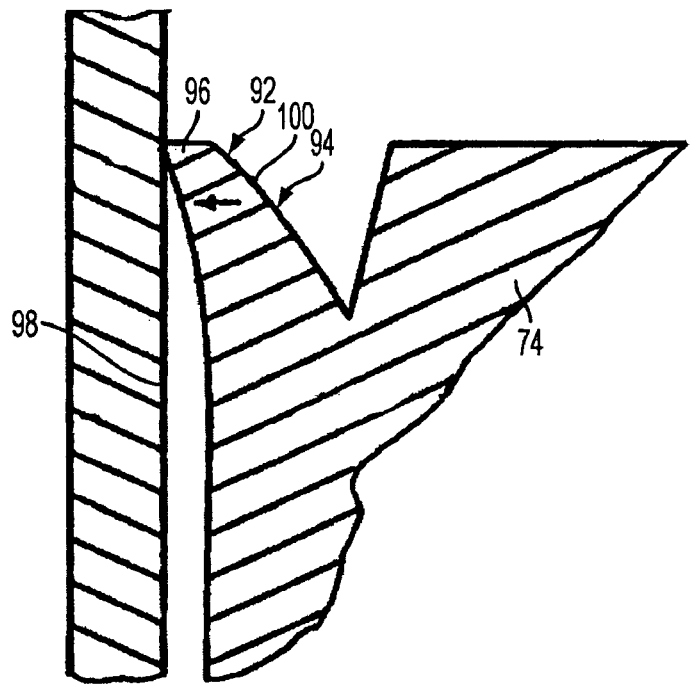
FIG. 10 is an elevational section of a portion of the cap of a piston of the expander according to the first representative embodiment. The cap defines a seal comprising a flexible lip that engages the inside wall of the cylinder.

As shown in FIG. 10, the cap 74 of each piston 50a, 50b of the expander 60 defines a seal 92 comprising a flexible lip 94. The tip 96 of the lip 94 engages the inner surface 98 of the cylinder 52 as urged by gas pressure on the back side 100 of the lip. I.e., whenever the cylinder 52 is pressurized, the tip 96 of the lip 94 is forced radially outward and against the surface 98. Thus, leakage of gas pressure across the piston 50 is substantially minimized. The seal 92 (and optionally the inner surface 98) desirably is made of a soft and "slippery" material such as a fluoropolymeric elastomer, thereby allowing the expander to be operated without lubrication. In FIG. 10, the clearance between the piston 50 and cylinder 52 has been exaggerated; typically, the outside diameter of the piston is approximately 100 micrometers less than the inside diameter of the cylinder.

Not intending to be limiting, a Scotch yoke is used in this embodiment as the kinematic linkage between the piston 50 and the shaft 66 in the expander 60. The yoke is guided by the piston 50 in the cylinder 52 on one end and another piston in a cylinder on the opposite side of the shaft 66. The bearing 54 coupling the piston rod 62 to the shaft 66 rides in a horizontal slot (serving as a crank arm) in the yoke moving the piston 50 up and down as the shaft 66 rotates. The location (x) of the piston 50 relative to TDC is defined by:

$$x = R(1-\cos(\theta)) \tag{6}$$

in which:
R=radius of crank arm
θ=rotational position of shaft (TDC=0)

The captured volume ($V_{cyl}$) of the cylinder 52 is obtained by multiplying the distance (1−cos(θ)) by the cross-sectional area of the piston 50 and adding the clearance volume ($V_{clear}$) (i.e., dead space at top of cylinder):

$$V_{cyl} = \frac{\pi}{4}D^2 R(1-\cos(\theta)) + V_{clear} \tag{7}$$

in which D=cylinder diameter. This relationship is used later to obtain pressure-volume curves from paired measurements of cylinder pressure and shaft-rotational position.

Figure 11:
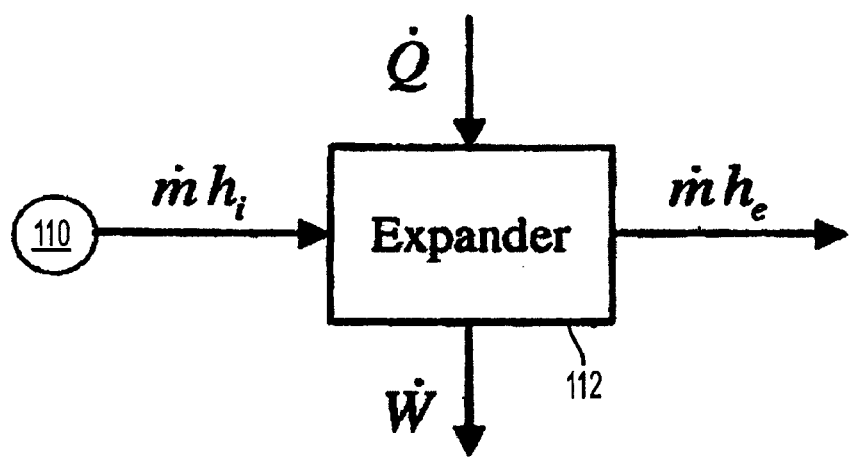
FIG. 11 is a schematic diagram showing a basic thermodynamic model of the first representative embodiment of the expander.

FIG. 11 shows a basic thermodynamic model of this embodiment. The working fluid 110 enters the expander 112 at the left and exits the expander with reduced enthalpy at the right. In addition, there may be some heat transfer into the expander 112. According to the first law of thermodynamics, the work produced by the expander 112 must equal the change in enthalpy of the working fluid 110 flowing through the expander plus the heat added. By definition, an isentropic process is one in which there is no heat transfer. Therefore, temporarily assuming an adiabatic process yields:

$$\dot{W} = \dot{m}(h_i - h_e) \tag{8}$$

in which:
$h_i$=specific enthalpy of the inlet mass of the working fluid 110
$h_e$=specific enthalpy of the working fluid exiting the expander 112
m=mass passing through the expander 112

Maximum work occurs when the process is reversible. In this case, the exiting enthalpy is at a minimum and is denoted by the subscript "s". The ratio of the actual work to this isentropic work is the isentropic efficiency ($\eta_s$):

$$\eta_s = \frac{\dot{W}}{\dot{W}_s} = \frac{\dot{W}}{\dot{m}(h_i - h_{e,s})} \tag{9}$$

in which:
$h_{e,s}$=specific enthalpy of exiting mass under isentropic expander operation
$W_s$=isentropic work potential If the working fluid is an ideal gas, then its enthalpy is directly proportional to its temperature. The exit temperature is then a function of the inlet temperature and the exhaust-to-inlet pressure ratio, yielding:

$$\eta_s = \frac{\dot{W}}{\dot{m}C_p(T_i - T_{e,s})} \tag{10}$$

in which:
$C_p$=constant-pressure specific heat of the working fluid
$T_i$=temperature of inlet mass
$T_{e,s}$ is the temperature of the exit mass under isentropic expander operation, and is expressed as:

$$T_{e,s} = T_i \left(\frac{P_e}{P_i}\right)^{k-1/k} \tag{11}$$

in which:

k=ratio of constant-pressure to constant-volume specific heats for working fluid $P_e$ is exit pressure $P_i$ is inlet pressure If the heat transfer into the expander 112 is not zero, the process is not isentropic, and the maximum possible work can potentially increase. The efficiency ($\eta_p$) of this polytropic process is defined by:

$$\eta_P = \frac{\dot{W}}{\dot{m}C_p(T_i - T_{e,s}) + \dot{Q}} \quad (12)$$

in which heat transfer is expressed as:

$$\dot{Q} = \dot{m}C_p(T_e - T_{e,s}) \quad (13)$$

in which $T_e$ is the temperature of the exit mass. I.e., the heat transfer is determined by the difference in exhaust temperature from the isentropic case. This permits a way of assessing the degree of heat transfer occurring during the gas-expansion process.

Note that the presence of heat transfer is not necessarily detrimental. Whenever heat transfer is sufficient to maintain the working fluid at constant temperature, the expansion process approaches the ideal isothermal expansion of the Carnot cycle. The extent to which heat transfer represents irreversibility depends on the temperature difference across which the heat is transferred. In the case of the Carnot expansion process, the temperature difference is assumed to be zero so that the process is fully reversible. As a general rule, however, heat transfer leads to irreversibility.

Figure 12:
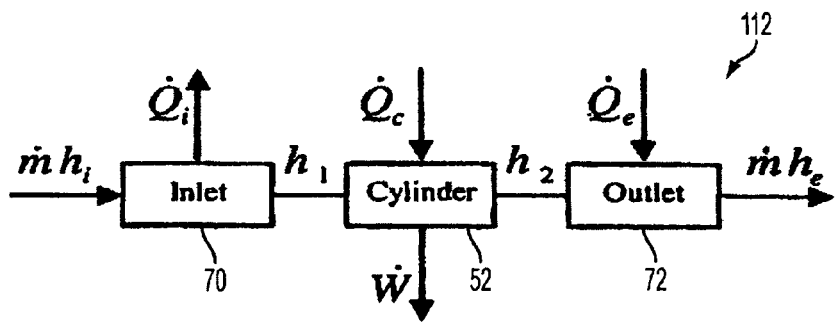
FIG. 12 is a more detailed schematic diagram of the thermodynamic model shown in FIG. 11.

FIG. 12 shows a more detailed thermodynamic model of the expander 112. The model provides the expander 112 with three portions: the inlet passage 70, the cylinder 52, and the exhaust passage 72. Heat transfer ($Q_i$) to the gas in the inlet passage 70 is assumed to be negative, and heat transfer ($Q_e$) to the gas in the exhaust passage 72 is assumed to be positive. ($Q_c$ is heat transfer to the gas in the cylinder 52.) Since no useful work is produced by heat transfer in either of the inlet passage 70 or exhaust passage 72, irreversibility is represented. In fact, the depicted configuration can be considered a short-circuit path for the enthalpy of the inlet stream of working fluid to reach the exhaust stream. However, the processes occurring in these portions are ideally constant-temperature processes and can be minimized by using a low-thermal-conductivity material for the valve block 68.

While heat transfer inside the cylinder 52 can produce useful work, as mentioned earlier, most of the heat transfer is irreversible. The rapid cycling of gas inside the cylinder 52 causes the cylinder walls 98 of the cylinder to act as a regenerator. Heat is absorbed by the walls 98 from the working-fluid vapor during fluid intake and returned to the vapor during the expulsion of the vapor. As such, the cyclic heat transfer can be a short-circuit path, for heat through the expander, that produces no useful work. An indication of the magnitude of this heat transfer can be obtained by using pressure-volume data to determine the polytropic exponent of the expansion phase of the cycle. During this phase, the mass in the cylinder 52 is fixed and the heat transfer to the vapor ($Q_p$) in the polytropic process can be calculated from the following equation:

$$Q_P = \left(\frac{k-n}{k-1}\right)\frac{P_1V_1 - P_2V_2}{n-1} \quad (14)$$

in which:

$P_1, P_2$=initial and final pressures in expansion process, respectively $V_1, V_2$=initial and final volumes in expansion process, respectively Note that the ratio on the right is the expression for isentropic work of an ideal gas. Thus, the ratio of heat transfer to work is proportional to the difference of the polytropic exponent from the ratio of specific heats.

Heat transfer in the expander 112 is strongly influenced by the particular selection of working fluid. Of primary consideration is the heat-capacity ratio, k.

As k approaches unity, operation of the expander approaches isothermal operation, as indicated by Equation (11). Reduced temperature swing in the cylinder reduces the cyclic heat transfer in the cylinder 52 proportionally. As long as this reduced heat transfer is not at the expense of the isentropic work potential of the working fluid (the enthalpy change for a given ratio of inlet and exit pressures, assuming isentropic expansion) then the losses in the expander 112 related to heat transfer should be reduced by lowering k.

Table 2 compares the properties of nitrogen and isopentane as exemplary working fluids. The numbers are based on an inlet temperature ($T_i$) of 130° C. and a pressure ratio of 5:1. The volumetric enthalpy change is based on the change in specific enthalpy of the gas under isentropic expansion divided by the final specific volume of the gas. Thus, this parameter represents a measure of the isentropic work potential for a given cylinder volume. Table 2 shows that, although slightly less work per stroke would be obtained with isopentane, the temperature swing in the cylinder is dramatically less. Accordingly, heat-transfer losses are potentially much less.

TABLE 2

Comparison of fluid properties related to cyclic heat transfer

| | Nitrogen | Isopentane | Units |
|---|---|---|---|
| Heat-capacity Ratio | 1.4 | 1.07-1.11 | — |
| Isentropic Temperature Swing | 155 | 41 | ° C. |
| Volumetric Enthalpy Change ($h_2 - h_1$)/$v_2$ | 410 | 320 | kJ/m$^3$ |

A dynamometer was constructed to measure the torque produced by the expander 60 at controlled speeds. The measurement setup included a 20-Watt motor for starting and loading the expander 60 and a torque/speed sensor for measuring the output power of the expander. The motor was a brushed DC motor (Maxon type S2322, Sachseln, Switzerland) with an attached digital encoder for control feedback to a motor controller (Maxon model 4-Q-DC LSC 30/2, Sachseln, Switzerland). To allow the motor to operate as a load, a four-quadrant speed controller was used, and a resistive load was connected in parallel to the power input of the controller. When braking, the power produced by the motor offset the power going to the fixed resistive load. Since the resistor desirably is sized to absorb the maximum braking load, the power supply desirably is able to supply this amount plus the maximum driving load.

The torque sensor (dynamometer) was a Model E-300 rotary non-contacting sensor unit manufactured by Sensor Technology (Upper Heyford, Bicester, Oxon, UK). The torque sensor measures torque by measuring the propagation speed of surface acoustic waves induced on the rotating shaft. The wave-velocity changes in proportion to stress in the material surface. The range of the torque sensor was ±100 mN-m with a specified accuracy of 0.25% of full scale. However, transverse loads on the sensor shaft caused by the couplers in the system reduced the precision of the device to about 1% of full scale.

Figure 13:
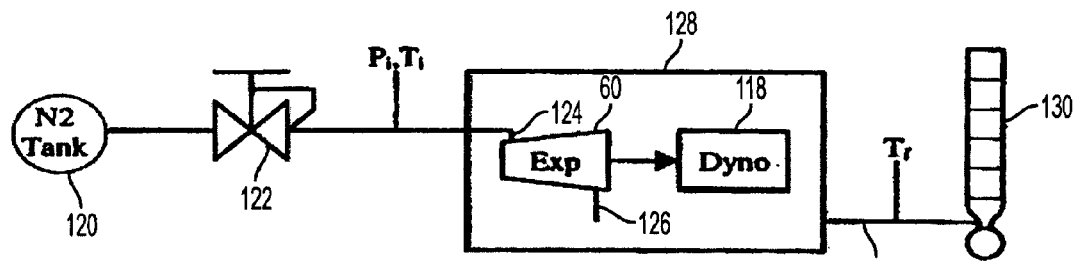
FIG. 13 is a schematic diagram showing the process-flow measurement setup used for performing evaluations of the first representative embodiment of the expander.

The process-flow measurement setup is shown in FIG. 13, showing the expander 60 and torque sensor (dynamometer) 118. For convenience, dry nitrogen gas was used as the working fluid in performance testing of the expander 60. The nitrogen gas was supplied from a tank 120 at room temperature and at 20 psig to 60 psig (regulated by the pressure regulator 122) to the inlet 124 of the expander 60. To avoid difficulties in measuring the pulsatile flow of gas to the inlet 124, flow of gas through the exhaust 126 was measured by mounting the expander 60 and dynamometer 118 inside an air-tight box 128 and connecting a bubble flow meter 130 to the exhaust 132 of the box. The dynamometer 118 was mounted inside the box 128 to avoid drag that otherwise would be caused by having to use rotary seals. By connecting the exhaust 126 of the expander 60 to a separate exhaust port (normally capped), the bubble flow meter 130 can also be used to measure the leakage rate across the piston seal during operation of the expander 60.

Figure 14:
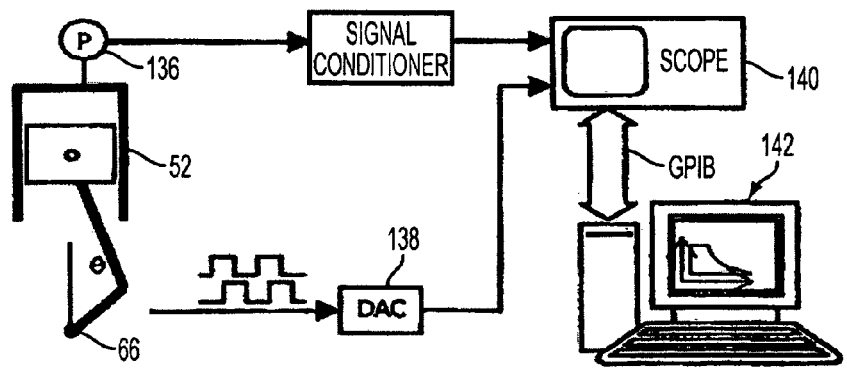
FIG. 14 is a schematic diagram showing the measurement setup used for producing pressure-volume curves of the expander cycle obtained using the first representative embodiment of the expander.

Pressure-volume curves of the expander cycle were obtained by using a piezo-resistive pressure transducer 136 (Endevco Model 8530-50, San Juan Capistrano, Calif.) to measure pressure inside the cylinder 52. Data from the transducer were used to generate P-V curves using a setup as shown in FIG. 14. A digital encoder (not shown) was coupled to the shaft 66 to allow measurements of rotational position of the shaft. The signals from the encoder were converted to corresponding analog signals using a digital-to-analog converter ("DAC") 138. The signals from the DAC 138 and from the transducer 136 were routed to and recorded on an oscilloscope 140 and then transferred to a computer 142 that converted the shaft-angle data to corresponding cylinder-volume data using Equation (7). The data were exported to a spreadsheet for analysis.

Figure 15:
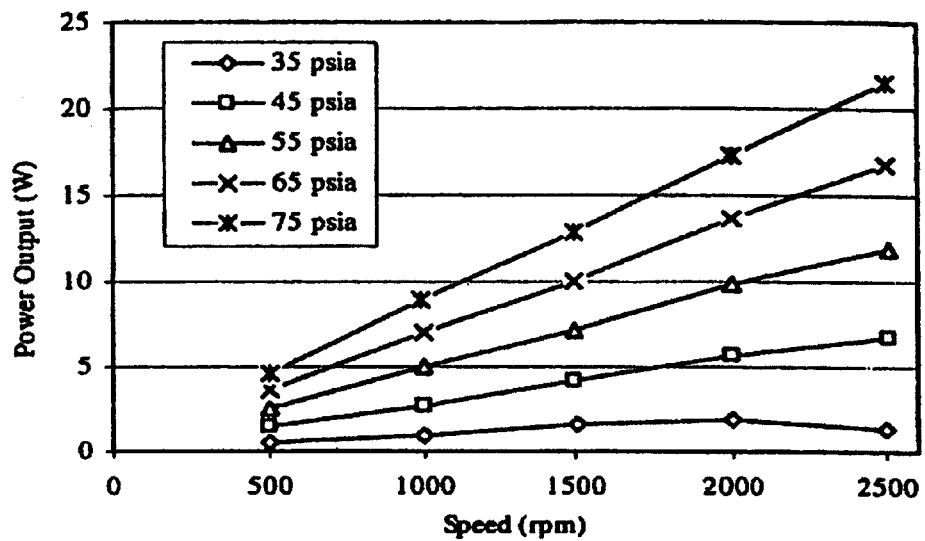
FIG. 15 is a plot of shaft power as a function of shaft rotational velocity for various inlet pressures to the first representative embodiment of the expander.
Figure 16:
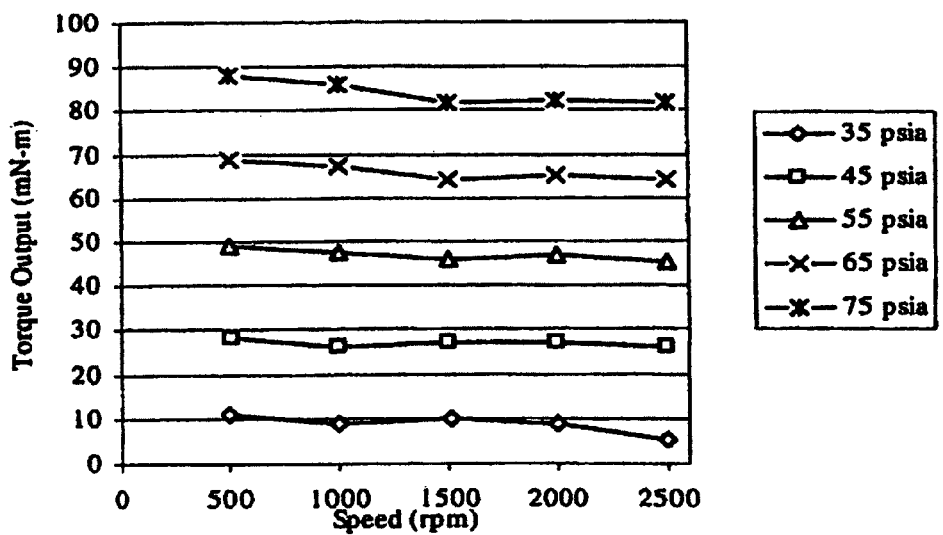
FIG. 16 is a plot of torque data as a function of shaft rotational velocity for various inlet pressures to the first representative embodiment of the expander, showing that torque is relatively independent of shaft rotational velocity.

FIG. 15 is a plot of shaft power as a function of shaft rotational velocity for various inlet pressures to the expander, and FIG. 16 shows corresponding torque data. The graphs show that torque is relatively independent of shaft speed, resulting in the linear power data. The small drop in torque exhibited in the range of shaft speed is primarily due to increasing pressure drop across the inlet valve with increases in shaft speed. This can be alleviated by increasing the diameter of the inlet port. The inlet valves were determined to close later, relative to shaft rotational position, above 1500 rpm, which allowed additional gas to flow into the cylinder. This additional gas resulted in a power boost that offset the increasing inlet loss.

Figure 17:
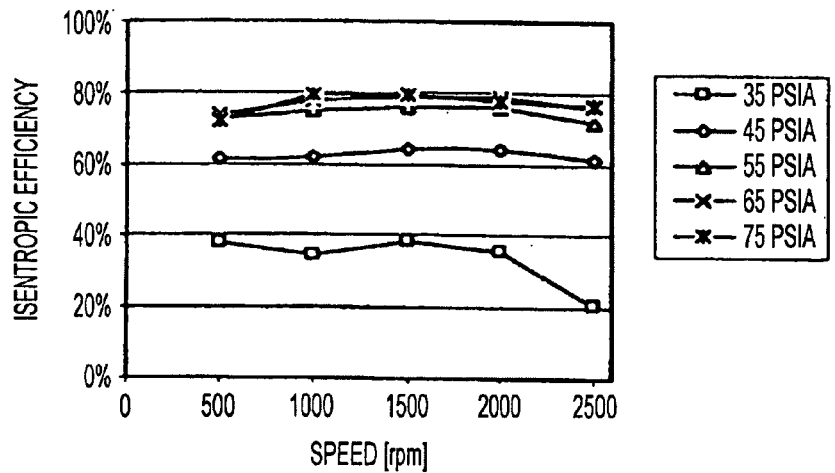
FIG. 17 is a plot of calculated isentropic efficiency, of the first representative embodiment of the expander, as a function of shaft rotational speed for inlet pressures ranging from 35 psia to 75 psia (20 psig to 60 psig).

FIG. 17 is a plot of calculated isentropic efficiency of the expander as a function of shaft rotational speed for inlet pressures ranging from 35 psia to 75 psia (20 psig to 60 psig). For the higher pressures of 55 psia and above, the isentropic efficiency is consistently in the range of 70% to 80%. At lower pressures, overexpansion of the gas appeared to generate negative cylinder pressures before the exhaust valve opened.

Observed decreased efficiencies at lower shaft velocities and higher pressures may have been caused by slight leaks around certain seals such as the piston lip seal and head gasket, especially at higher inlet pressures. Preventing such leaks would follow routine optimization of sealing surfaces and sealing materials.

Figure 18:
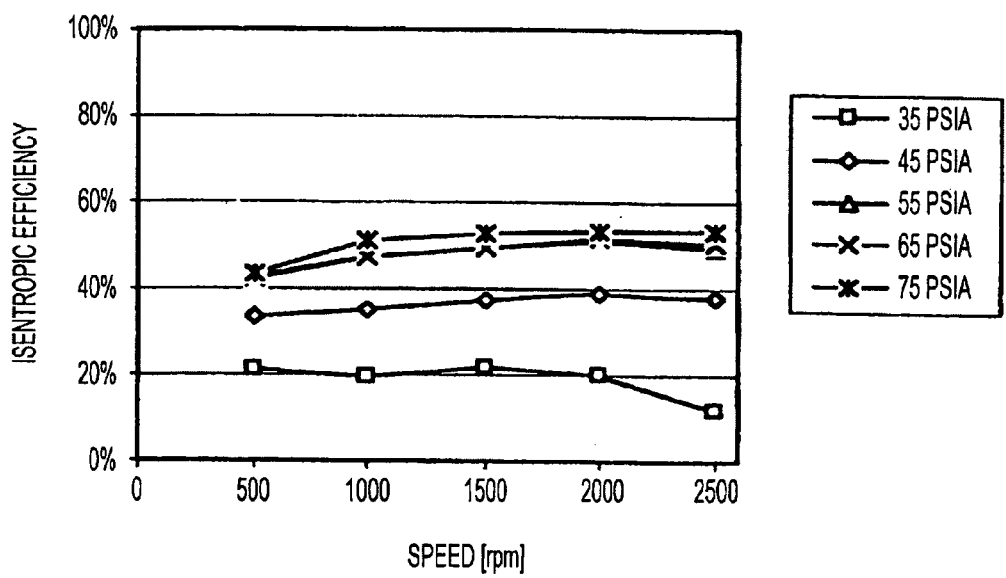
FIG. 18 is a plot of polytropic efficiency, of the first representative embodiment of the expander, as a function of shaft velocity for inlet pressures ranging from 35 psia to 75 psia. Heat transfer was calculated using Equation (13).

FIG. 18 is a plot of polytropic efficiency of the expander as a function of shaft velocity for inlet pressures ranging from 35 psia to 75 psia. The heat transfer was calculated using Equation (13). The temperature of vapor exiting the expander through the exhaust valve was measured by inserting a thin-gauge thermocouple into the exhaust port of one of the cylinders. Because the temperature reading was very sensitive to thermocouple placement, a significant portion of the heating likely occurred in the exhaust port. But, not all the heat transfer is attributable to the exhaust ports. The polytropic exponents obtained by curve fitting to the expansion portion of the PV data are consistently about 1.1 at 500 RPM and 1.2 at 2500 RPM. These data indicate that the temperature swing of the gas during the expansion phase is 25% to 50% of that for isentropic expansion.

Cooling of the intake gas, either in the inlet passage or in the cylinder, is indicated by higher mass-flow rates through the cylinder than predicted by an adiabatic-expander model. Typically, excess flow was 20% higher than explainable by the measured leak rates. Some portion of this excess is also due to heating during the expansion and exhaust phases. Higher exhaust temperature results in less mass in the cylinder when the exhaust valve closes.

Figure 19:
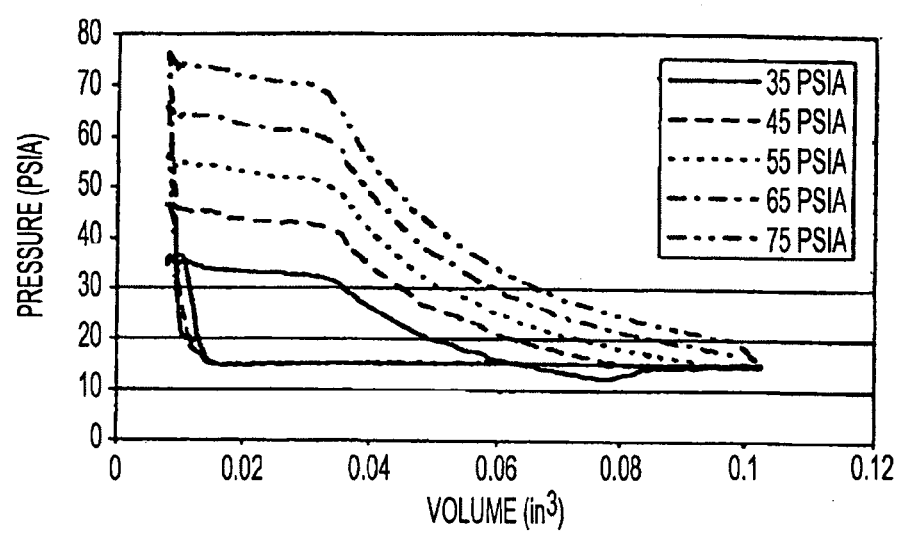
FIG. 19 is a plot, for the first representative embodiment of the expander, of P-V (pressure-volume) data recorded with the expander operating at 1500 rpm shaft speed and at an inlet pressure ranging from 35 psia to 75 psia.

FIG. 19 is a plot of P-V (pressure-volume) data recorded with the expander operating at 1500 rpm shaft speed and at an inlet pressure ranging from 35 psia to 75 psia. Each plot starts at the upper left and progresses clockwise in a loop. The intake phases are first, and are indicated by the relatively horizontal portions extending across the top of each loop. At about 0.03 in$^3$, the inlet valve closes and expansion begins. The opening of the exhaust valve at the end of the expansion is indicated by the abrupt drop in pressure exhibited by the 75 and 65 psia plots near 0.10 in$^3$. The respective exhaust strokes correspond to the substantially horizontal line extending across the bottom to where the exhaust valve closes at 0.015 in$^3$. A slight recompression occurs before the inlet valve opens just before TDC.

The pressure drop during the intake phase is much more noticeable than the backpressure during the exhaust phase. It is believed this discrepancy arises from the difference in the length of conduits leading to the respective valves. For example, the intake valve was connected by several inches of conduit to a surge tank at which supply pressure was measured. In contrast, the exhaust valve vents directly to the atmosphere.

Representative Embodiment of Compressor

Figure 20A:
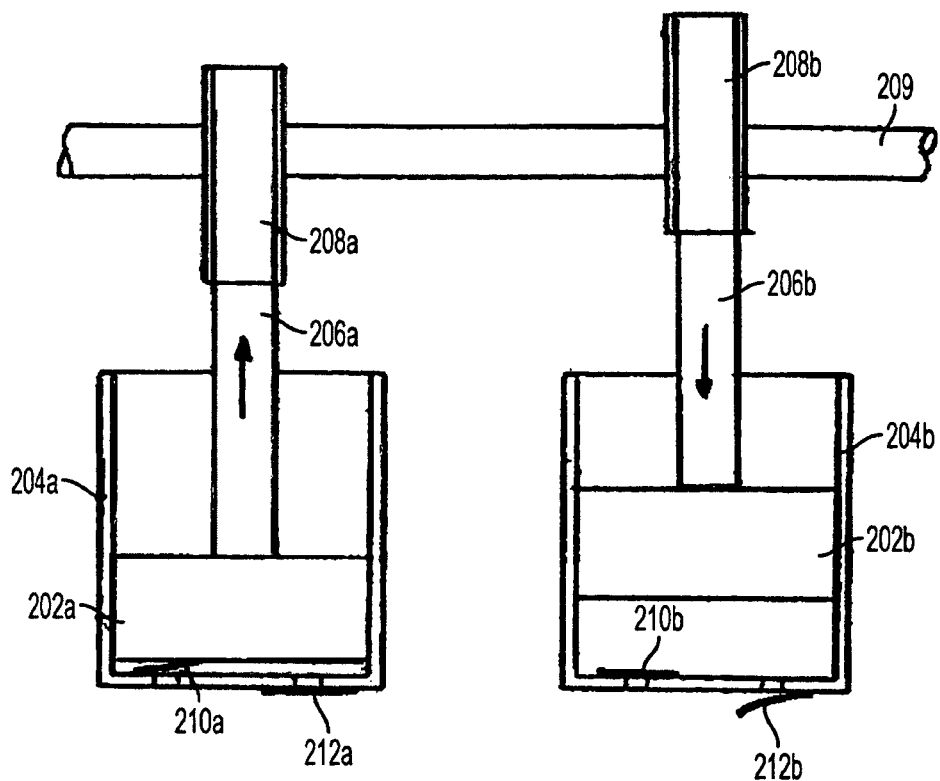
FIG. 20($a$) schematically depicts certain details of the pistons, cylinders, and flapper valves of the first representative embodiment of the compressor.

Turning to FIG. 20(a), this compressor embodiment 200 comprises two pistons 202a, 202b each situated in a respective cylinder 204a, 204b. By way of example, each piston 202a, 202b has a diameter of 1.0 inch and a stroke of 0.48 inches, yielding a total displacement of $2\pi(0.48)[(1.0)/2]^2 = 0.754$ in$^3$ (total for both cylinders) in the compressor 200. Each piston 202a, 202b is coupled by a respective rod 206a, 206b and bearing 208a, 208b to a shaft 209. Each cylinder 204a, 204b includes a respective inlet valve 210a, 210b and respective exhaust valve 212a, 212b. Movement of the pistons 202a, 202b in the respective cylinders 204a, 204b is 180° out of phase (i.e., as one piston undergoes a downward stroke, the other piston undergoes an upward stroke; when one piston is at TDC, the other piston is at BDC).

Figure 20B:
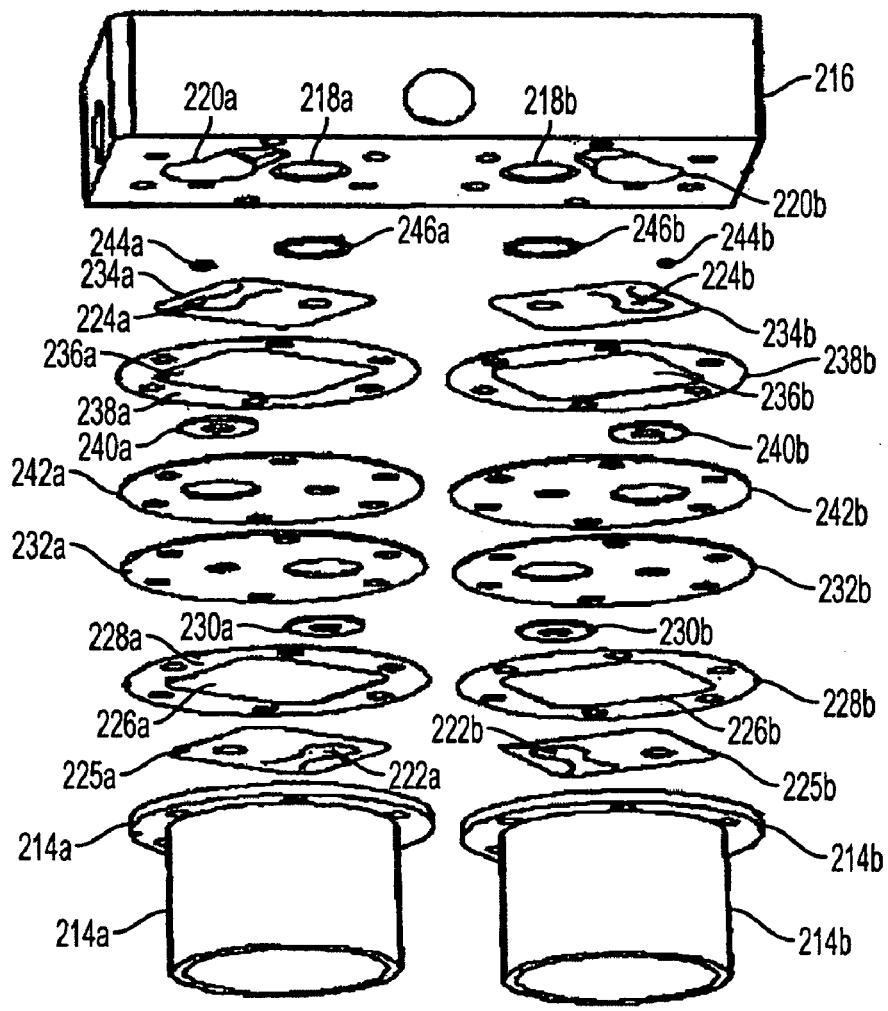

The exploded view of FIG. 20(b) depicts details of the cylinders 204a, 204b and valves. The cylinders 204a, 204b are shown, each with a respective flange 214a, 214b. The flanges 214a, 214b mount to a valve block 216, with valve components being situated therebetween. For each cylinder 204a, 204b, the valve block 216 defines a respective inlet port 218a, 218b and a respective exhaust port 220a, 220b. Passage through the inlet ports 218a, 218b to inside the cylinders is governed by respective inlet-valve flappers 222a, 222b, and exhaust from the cylinders is governed by respective exhaust-valve flappers 224a, 224b. The inlet-valve flappers 222a, 222b are defined in respective inlet-flapper members 225a, 225b that nest in respective voids 226a, 226b defined in respective inlet-valve spacers 228a, 228b. Each inlet-valve flapper 222a, 222b, when in a closed position, seals against a respective gasket 230a, 230b of a respective flapper seat 232a, 232b. The exhaust-valve flappers 224a, 224b are defined in respective exhaust-flapper members 234a, 234b that nest in respective voids 236a, 236b defined in respective exhaust-valve spacers 238a, 238b. Each exhaust-valve flapper 224a, 224b, when in a closed position, seals against a respective gasket 240a, 240b of a respective flapper seat 242a, 242b. Gaskets 244a, 244b, 246a, 246b complete the sealing to the valve block 216.

The cylinders 204a, 204b and pistons 202a, 202b can be made of any suitable rigid material capable of withstanding exposure to the working fluid under the temperature and pressure conditions encountered in the compressor 200. In this embodiment the cylinders 204a, 204b and pistons 202a, 202b are made of an aluminum bronze for wear-resistance and low friction. The valve block 216 in this embodiment is made of aluminum alloy.

In one embodiment the flapper members 225a, 225b, 234a, 234b are made from thin sheets (shim stock, 0.002-inch thick) of stainless steel. The flapper seats 232a, 232b 242a, 242b are made of a nitrile elastomer covering silicone rubber, as are the gaskets 230a, 230b, 240a, 240b. The gaskets 244a, 244b, 246a, 246b are respective elastomeric O-rings. In another embodiment the flapper members were made of 0.003-inch thick spring steel shim.

The inlet valves 210a, 210b and exhaust valves 212a, 212b, as flapper valves, operate on respective pressure differentials that exist or are established across each valve. The flapper valves are passive and require no mechanical actuation. As a piston 202a moves downward from TDC, a small volume of trapped gas in the cylinder 204a is expanded until the pressure of the gas drops below the pressure in the conduit leading to the inlet valve 210a, at which moment the higher pressure in the conduit urges the inlet-valve flapper 222a open. Working fluid then flows through the open valve 210a into the cylinder 204a until the piston 202a reaches BDC. At BDC, as the piston 202a reverses stroke direction, the inlet-valve flapper 222a closes by spring action of the flapper itself. The fluid in the cylinder 204a is then compressed until the pressure in the cylinder rises above the exhaust pressure and thus pushes the flapper 224a of the exhaust valve 212a open. As the piston 202a continues to move to TDC, the compressed vapor exits the cylinder 204a through the exhaust valve 212a.

The shaft 209 to which the pistons 202a, 202b of the compressor 200 are coupled is the same shaft that is coupled to the pistons of the expander. Consequently, rotation of the shaft caused by reciprocation of the pistons of the expander causes corresponding reciprocation of the pistons 202a, 202b of the compressor 200. In other words, the compressor 200 is directly linked to the expander such that operation of the expander directly causes operation of the compressor, and the compressor exploits at least a portion of the work generated by the expander. This direct coupling of the compressor to the expander reduces coupling losses that otherwise would arise between the expander and compressor if these two components were not coupled in this manner.

Second Representative Embodiment of Expander

Figure 21:
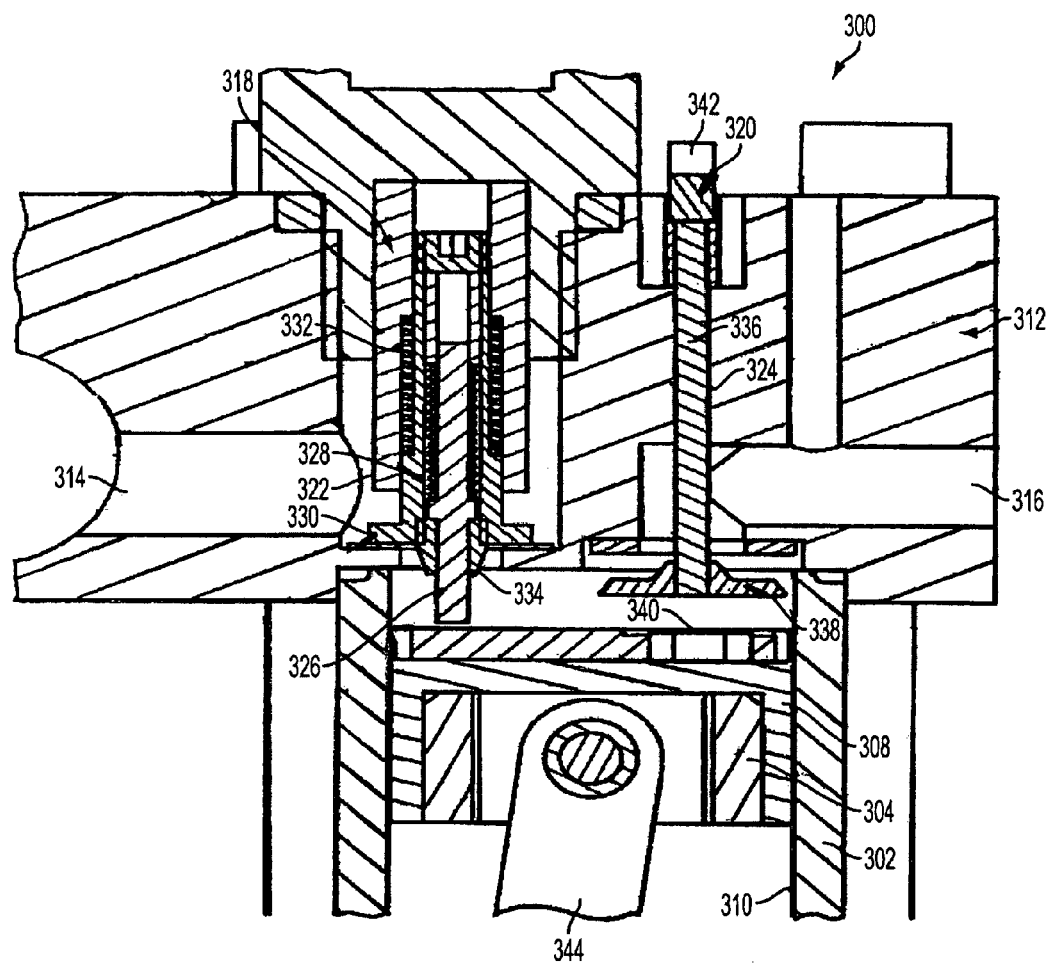
FIG. 21 is an elevational section of the upper portion of one of the cylinders of an expander according to a second representative embodiment.

As in the first representative embodiment, the expander of the second representative embodiment uses a piston-actuated valve system to control fluid flow into and out of the cylinders. The general configuration of the cylinders and valves of this embodiment are as shown in FIGS. 8(a)-8(c) and 9(a). Regarding more specific details, an elevational section of the upper portion of one of the cylinders 302 of the expander 300 is shown in FIG. 21. Also shown is the piston 304 situated within the cylinder 302, and a portion of the connecting rod 306 coupling the piston 304 to the shaft (not shown). The piston 304 includes a cap 308 that defines, inter alia, a seal with respect to the inside surface 310 of the cylinder (seal not detailed, but see FIG. 10). The cylinder 302 is mounted to a cylinder head 312 that defines an inlet port 314 and an exhaust port 316. Mounted to the cylinder head 312 are an inlet valve 318 and an exhaust valve 320. The inlet valve 318 controls flow of working fluid from the inlet port 314 into the cylinder 302, and the exhaust valve 320 controls flow of working fluid from the cylinder out through the exhaust port 316. The inlet valve 318 and exhaust valve 320 extend through respective bores 322, 324 defined in the cylinder head 312.

The inlet valve 318 is a spring-loaded poppet valve comprising a tappet 326 and associated spring 328 situated in the bore 322. The tappet 326, in turn, interacts with an inlet-valve poppet 330 that is spring loaded by a respective spring 332. In operation, the piston 304 first contacts the inlet tappet 326 about 0.080 inch before TDC. The tappet spring 328 is configured such that its spring force, upon compression, cannot overcome the force produced by the pressure difference across the closed inlet valve 318. This causes the tappet spring 328 to compress while the inlet valve 318 remains closed. Just before TDC, the piston 304 contacts a nipple 334 extending from the inlet poppet 330, and the resulting force applied to the inlet poppet forces the inlet valve 318 open. Opening of the inlet valve 318 relieves the pressure difference across the inlet valve, allowing the tappet spring 328 to push the inlet poppet 330 fully open and to hold it fully open until the piston 304 has moved back down sufficiently so that the inlet tappet 326 is fully extended. As the piston 304 continues to move downward, the inlet-poppet spring 332 (which is a "softer" spring than the inlet-tappet spring 328) pushes the inlet valve 318 closed again.

The exhaust valve 320 comprises a rod 336 and valve disk 338. The exhaust valve 320 is actuated by an elastomeric bumper 340 mounted in the piston cap 308. The bumper 340 protrudes about 0.010 inch from the upper surface of the piston cap 308 so that the bumper can contact the disk 338 and thus push the exhaust valve 320 closed just before the piston 304 contacts the nipple 334 on the inlet poppet 330. As the exhaust valve 320 closes, it actuates a rocker arm 342 that couples the respective exhaust valves 320 of the two cylinders 302 of the expander 300. Because the pistons 304 operate 180° out of phase with each other, the rocker arm 342 causes the exhaust valve 320 of one cylinder 302 to open at BDC as the exhaust valve 320 of the other cylinder 302 closes at TDC.

To avoid contamination of other portions of the system, it is desirable that the expander 300 operate without requiring lubrication. To such end, the piston caps 308 can be made, for example, of polyphenylene sulfide (PPS), which provides a wear-resistant, low-friction running surface for the pistons 304 relative to the inside surfaces 310 of the cylinders 302. The piston cap is formed with a lip seal similar to that shown in FIG. 10 and discussed in the description of the first representative embodiment. By way of example, the lip is 0.005-inch thick. Whenever the cylinder 302 is pressurized, the lip flexes radially outward slightly to seal against the inside surface 310 of the cylinder. The piston 304 is coupled by a rod 344 to the shaft (not shown).

Representative Embodiment of Integrated Expander/Compressor

Figure 22:
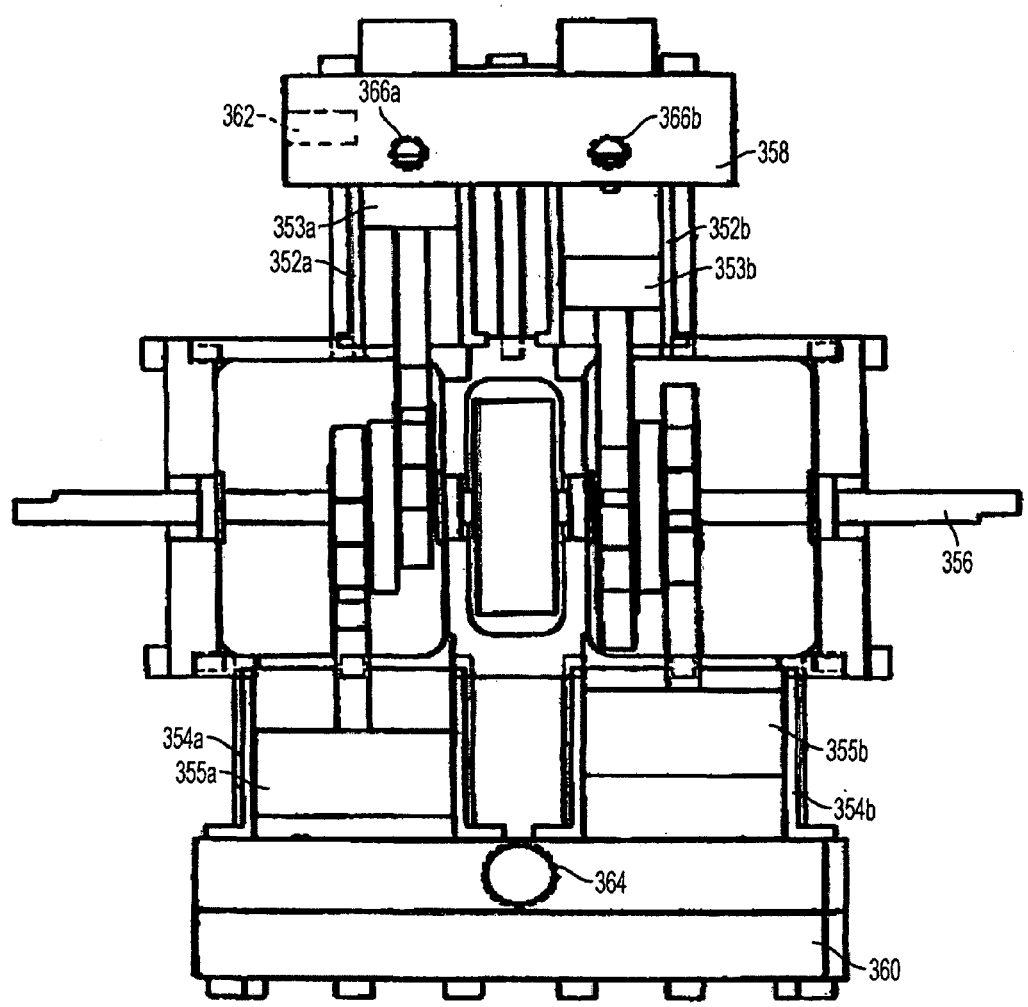
FIG. 22 is a perspective view of a representative embodiment of an integrated expander/compressor

An integrated expander/compressor 350 according to this embodiment is shown in FIG. 22 and comprises a pair of expander cylinders 352a, 352b (and respective pistons 353a, 353b located inside the cylinders) and a pair of compressor cylinders 354a, 354b (and respective pistons 355a, 355b located inside the cylinders) mounted to a common crankshaft 356. The expander cylinders 352a, 352b are mounted to a cylinder head 358 to which the expander valves (not detailed) are mounted. Similarly, the compressor cylinders 354a, 354b are mounted to a cylinder head 360 to which the compressor valves (not detailed) are mounted. Exemplary valves for the expander cylinders 352a, 352b can be as described in the representative embodiments discussed above (i.e., spring-loaded poppet valves actuated by spring-loaded tappets mounted on the expander pistons). Similarly, exemplary valves for the compressor cylinders 354a, 354b can be as described in the representative embodiment discussed above (i.e., passive "flapper" valves). In the embodiment shown in FIG. 22, the expander cylinders 352a, 352b are above and the compressor cylinders 354a, 354b are below the shaft 356. Further with respect to the figure, the expander inlet 362 is situated at top left and the compressor inlet 364 is situated at the bottom center. The expander exhaust ports 366a, 366b are defined in the cylinder head 358, and the compressor exhaust ports (defined in the cylinder head 360) are not visible in the drawing.

In the integrated expander/compressor, the expander portion is a relatively high-pressure portion, in which the spring-loaded and -actuated poppet valves (as described above) are advantageously employed. The compressor portion, on the other hand, is a relatively low-pressure portion, in which the passive "flapper" valves, as described above, are advantageously employed. In addition, the pistons of the expander portion are substantially non-compliantly linked, via their respective rods and bearings coupled to the shaft, to the pistons of the compressor.

For evaluations thereof, the integrated expander/compressor was configured to exhaust into ambient atmosphere. Consequently, the device was evaluated in a sealed chamber. A low-pressure working fluid (i.e., a fluid with a vapor pressure less than 1 atmosphere at room temperature) was selected. The chamber was made of glass to allow visual inspection of the device during operation.

The expander/compression device was sized to provide up to 150 W of cooling at 2500 rpm with HFE-7000 working fluid. The device had a cylinder bore of 0.5 inch for the expander and 1 inch for the compressor. Both pairs of pistons had a stroke of 0.48 inch, yielding a total displacement of 0.189 in$^3$ for both expander cylinders and 0.756 in$^3$ for both compressor cylinders.

At this miniature scale, heat transfer can be significant, and its impact on device efficiency measurements was considered. In the expander, adding heat during expansion reduces the rate at which pressure falls as the gas is expanded volumetrically. As a result, more work can be produced from a given mass drawn into the cylinder. Hence, an expander operating with heat addition theoretically can operate with an isentropic efficiency greater than 100%. Conversely, removing heat from the compressor also reduces the rate at which pressure rises during compression so that the work required to compress and discharge the contents of the cylinder is less than that in the isentropic case. Since compressor efficiency is defined inversely from that of expander efficiency (i.e., reversible/actual instead of actual/reversible) heat removal can once again result in theoretical performance greater than unity.

Although heat transfer can (depending on the direction of heat flow) skew efficiency measurements upward, no measurements were made to determine the degree to which heat was added during the expansion/compression process versus during the exhaust process. Heat added during the exhaust process does not alter the theoretical work. For this reason, isentropic efficiency was used as the measure of device performance despite its potential to overestimate.

The evaluation apparatus (including expander/compressor and sealed chamber) was set up on a bench top. The apparatus comprised a sealed glass enclosure that contained the expander/compressor. Flow-loop components were installed outside the glass enclosure and connected through the glass enclosure to the expander/compressor. The enclosure also contained a miniature dynamometer coupled to the expander/compressor. The apparatus allowed testing of the expander/compressor with either a gaseous working fluid, such as nitrogen gas, or a two-phase refrigerant (such as HFE-7000). A 16-channel computer data-acquisition system was used for collecting the process data used for calculating or otherwise determining the performance of the expander/compressor. EES was used for calculating all performance results obtained using HFE-7000 as the working fluid.

Figure 23:
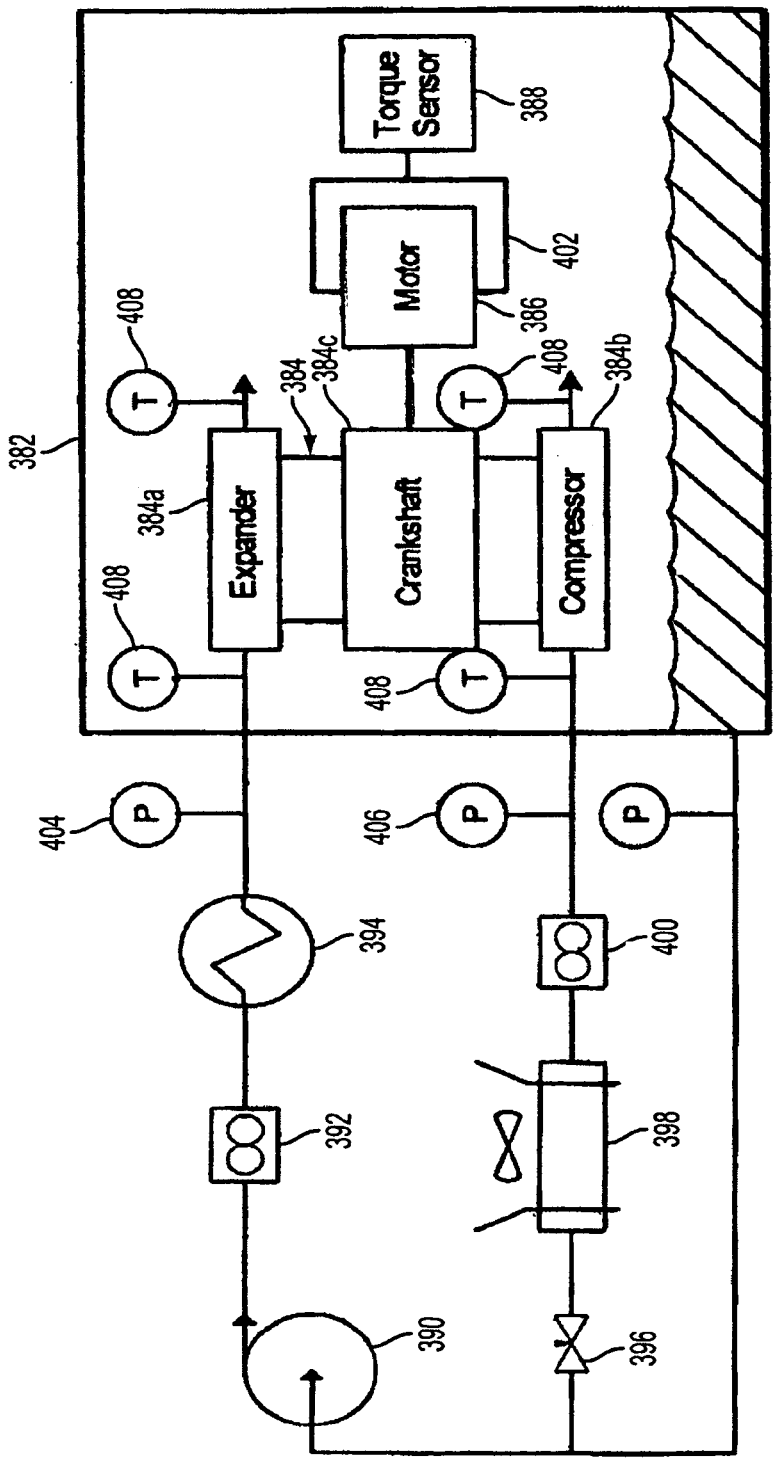
FIG. 23 is a schematic diagram of a circuit of certain components of an apparatus used for evaluating the first representative embodiment of an integrated expander/compressor.

Certain components of the evaluation apparatus 380 are shown in FIG. 23, showing the glass enclosure 382 housing the expander/compressor 384 (comprising expander 384a and compressor 384b). Also contained in the enclosure 382 was a motor 386 for driving the expander/compressor 384 and a torque sensor 388 coupled to the motor 386. Outside the enclosure 382 were a pump 390, a coriolis-based mass-flow controller 392, a vaporizer 394, a needle valve 396, an evaporator 398, and a thermal-based mass-flow controller 400. The pump 390 was a magnetically coupled gear pump (Micropump, Vancouver, Wash.). The coriolis-based mass-flow controller 392 (Brooks Instruments "Quantim" type QMAC-003K, Hatfield, Pa.) was used for measuring inlet flow to the expander 384a. The vaporizer 394 comprised an electrically heated copper block with a series of internal fluid passageways. To promote rapid heat transfer, a first passageway contained an aluminum plug about 1 mm smaller in diameter than the diameter of the passageway, which forced liquid to flow along heated walls of the passageway. By wrapping a fine-mesh screen around the plug, problems with slug flow were eliminated. Inlet pressure to the expander 384a was measured using a high-temperature, absolute-pressure sensor 404 (Endevco model 8540-200, San Juan Capistrano, Calif.). For the compressor 384b, a simple tube-in-fin heat-exchanger was used as the evaporator 398, and inlet flow was measured using the thermal-based mass-flow controller 400 (MKS model 0558A-100L-SB, Wilmington, Mass.). Inlet pressure to the compressor 384b was measured using an absolute pressure sensor 406 (Omega PX302-030AV, Stamford, Conn.). Respective temperatures in the expander 384a and compressor 384b were measured using ungrounded Type-K thermocouples 408 (Omega KQMSS-062U-6, Stamford, Conn.). The motor 386 was a 90-Watt motor (Maxon model 948931, Sachseln, Switzerland) mounted in a cradle 402 connected to the torque sensor 388. The torque sensor 388 was a 30 oz-in static-reaction torque sensor, Omega type TQ202-30Z, Stamford, Conn. The resulting assembly functioned as a dynamometer. As the motor 386 applied torque to the shaft 384c of the expander/compressor 384, the reaction torque on the cradle 402 was measured by the torque sensor 388.

For testing the expander 384a using compressed nitrogen as a working fluid, the glass enclosure 382 was left open and the pump 390 and coriolis-based mass-flow controller 392 were replaced with a nitrogen tank, pressure regulator, and thermal-based mass-flow controller (MKS model 179A24CS3BM, Wilmington, Mass.), not shown. For testing the compressor 384b with air as a working fluid, the needle valve 396 and evaporator 398 were replaced with a pressure-reducing regulator (not shown) that had an inlet open to the atmosphere.

Pressure-volume (P-V) curves from the expander 384a and compressor 384b were obtained using respective piezo-resistive pressure transducers (Endevco types 8530C-50 and 8530C-100, respectively, San Juan Capistrano, Calif.) configured for measuring in-cylinder pressure. A digital encoder (US Digital type E2, Vancouver, Wash.) was attached to the shaft 384c of the expander/compressor 384 for measuring rotational position of the shaft. Data from these components were recorded by the computer programmed with the LabVIEW program that used the kinematic relationship between the shaft position and piston positions to convert angle data to cylinder-volume data. In addition to displaying P-V curves in real time, the program integrated the P-V curves to determine respective work done on the piston face during each revolution of the shaft. By comparing this P-V work to the work measured at the shaft 384c, frictional losses could be determined. The ratio of these work values was termed the "transmission efficiency."

Figure 24:
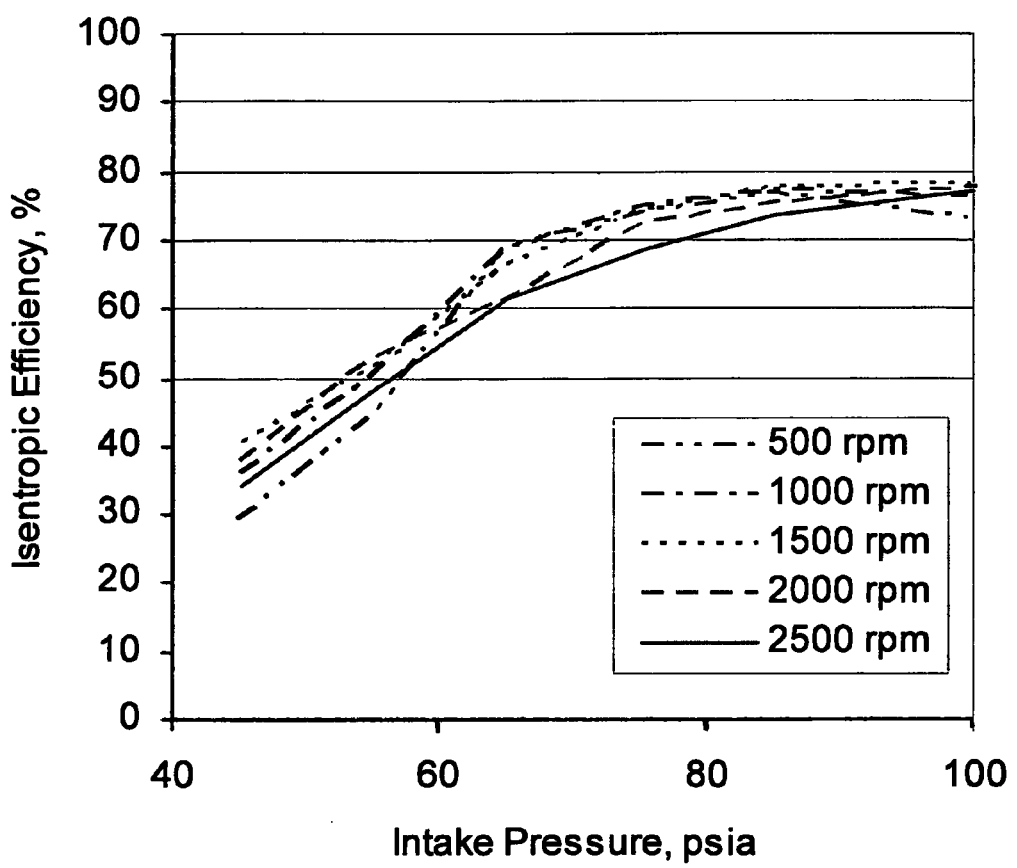
FIG. 24 is a plot, obtained during evaluation of the first representative embodiment of the integrated expander/compressor, of isentropic efficiency of the expander operating on compressed nitrogen (as a working fluid) at room temperature.
Figure 25:
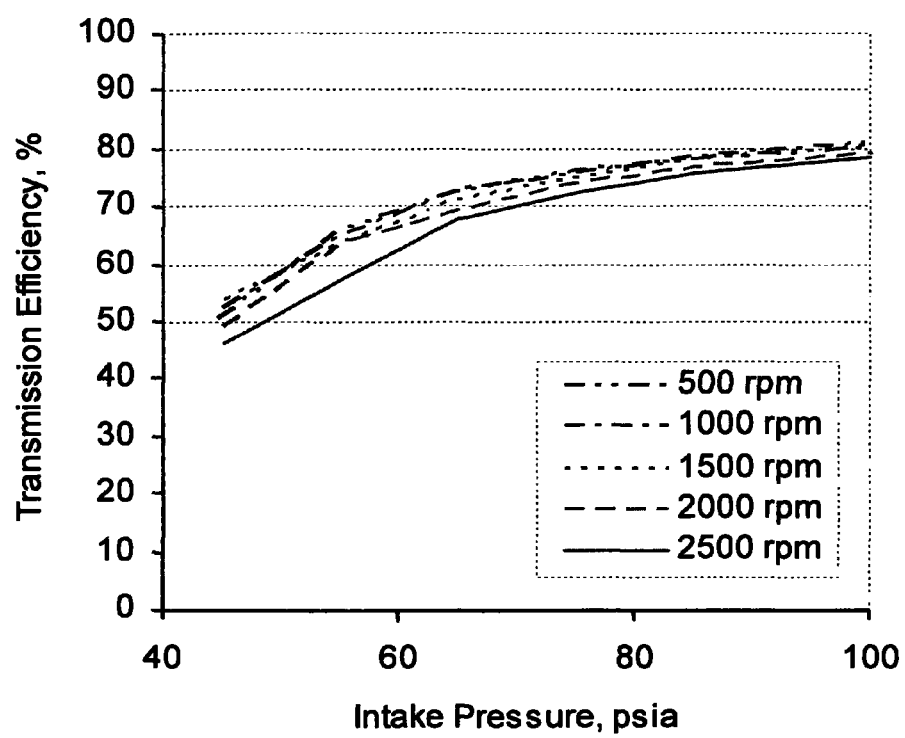
FIG. 25 is a plot, obtained during evaluation of the first representative embodiment of the integrated expander/compressor, of the transmission efficiency (shaft work relative to work done on the piston face) of the expander as a function of intake pressure of nitrogen used as a working fluid.

FIG. 24 shows the isentropic efficiency of the expander 384a operating on compressed nitrogen at room temperature and discharging the nitrogen to atmospheric pressure. Efficiency was strongly affected by pressure and only weakly affected by operating speed of the expander 384a. Maximum efficiency was 78% at 1500 rpm and 100 psia inlet pressure (a pressure-ratio of 6.8). FIG. 25 shows the transmission efficiency (shaft work relative to work done on the piston face) of the expander 384a. These graphs reveal that power loss is caused largely by friction. At an inlet pressure of nearly 80 psia, transmission efficiency equals the isentropic efficiency, indicating that friction accounts for all expander losses. This is explained by the earlier-mentioned boost in performance caused by heat-transfer (i.e., small thermo-fluid losses are balanced by heat input to the expander 384a from the environment).

Figure 26:
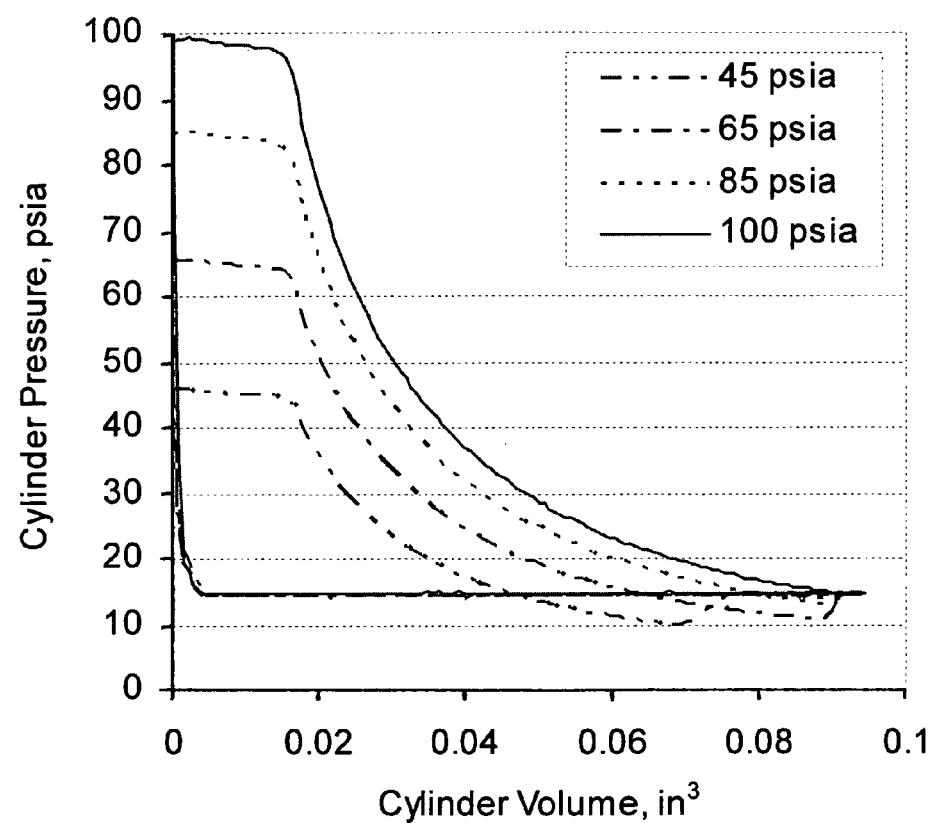
FIG. 26 is an array of P-V curves, obtained during evaluation of the first representative embodiment of the integrated expander/compressor, recorded from one expander cylinder operating at 1500 rpm shaft velocity.

FIG. 26 shows P-V curves recorded from one expander cylinder operating at 1500 rpm shaft velocity. The graphs reveal a slight over-expansion when the intake pressure was less than 100 psia, which was attributed to a slight stickiness of the seat material (silicone rubber) used in the exhaust valves of the expander, which prevented the exhaust valves from popping open until after the cylinder pressure was about 5 psia below exhaust pressure.

Figure 27:
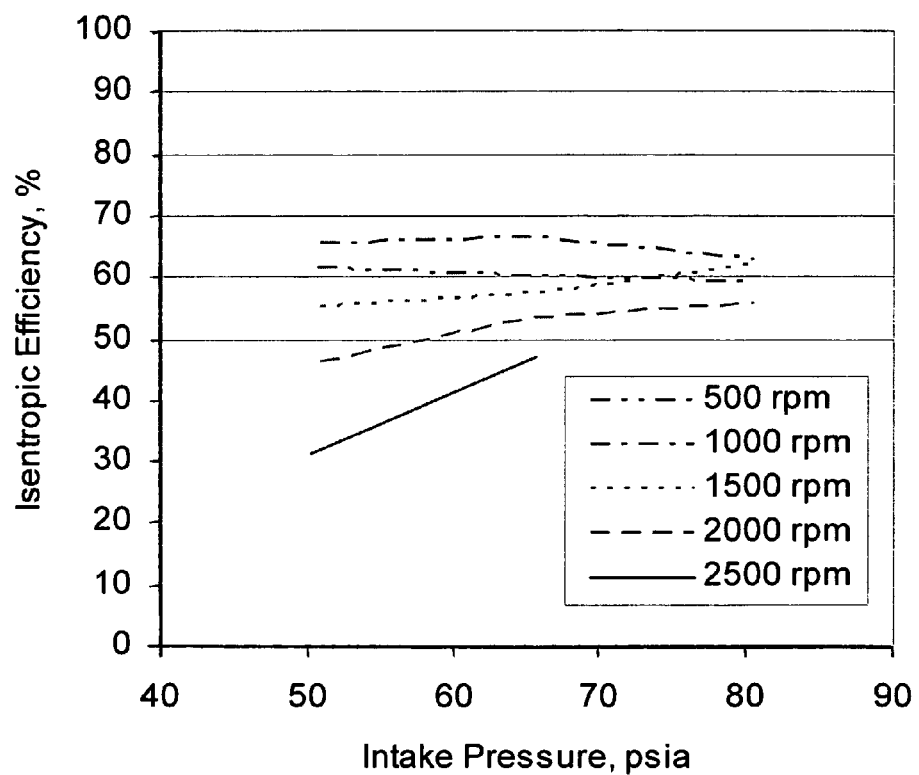
FIG. 27 is a plot of the isentropic efficiency of the expander, of the first representative embodiment of an integrated expander/compressor, operating with HFE-7000 as the working fluid.

FIG. 27 shows the isentropic efficiency of the expander 384a operating with HFE-7000 as the working fluid. Inlet pressures varied from 50 to 80 psia, and operating speeds ranged from 500 to 2500 rpm. Although inlet temperature was targeted at 125° C., some heat loss from the conduits between the vaporizer 394 and the expander 384a resulted in a slightly lower inlet temperature. This heat loss can be largely prevented using insulation. Exhaust pressure varied, according to the saturation pressure of the liquid in the enclosure 382, from 10.4 to 11.8 psia. The maximum efficiency was 66% at 1000 rpm and 55 psia inlet pressure. Since HFE-7000 (molecular weight=200 g/mol) has greater density than nitrogen, mild pressure drops occurred across the inlet and exhaust ports of the expander/compressor 384, which yielded lower efficiency at higher speeds using HFE-7000. At the lowest speed, some heat loss occurred in the inlet conduit. For the same intake pressure, up to twice the mass flow per revolution was observed at 500 rpm compared to higher speeds.

Figure 28:
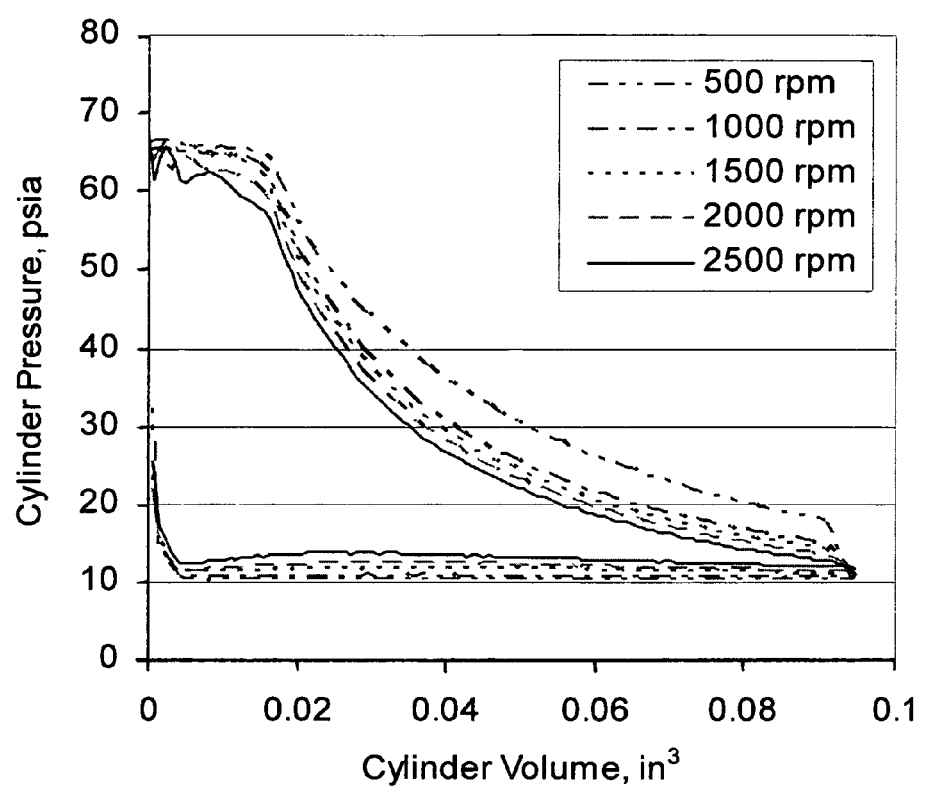
FIG. 28 is an array of P-V curves, obtained during evaluation of one expander cylinder of the first representative embodiment of the integrated expander/compressor, operating at a constant inlet pressure and varying shaft velocity.

FIG. 28 shows P-V curves obtained from one cylinder of the expander 384a at constant inlet pressure and varying speed. The graph shows how the area inside the curve (which is proportional to the work done on the piston) decreases as pressure drop increases with speed. Condensation also affected the data obtained at 500 rpm. As the pressure drops during expansion, the small amount of liquid that is present evaporates and raises the pressure above the higher-speed curves. Thus, more work is produced per revolution at lower speeds than at higher speeds.

Figure 29:
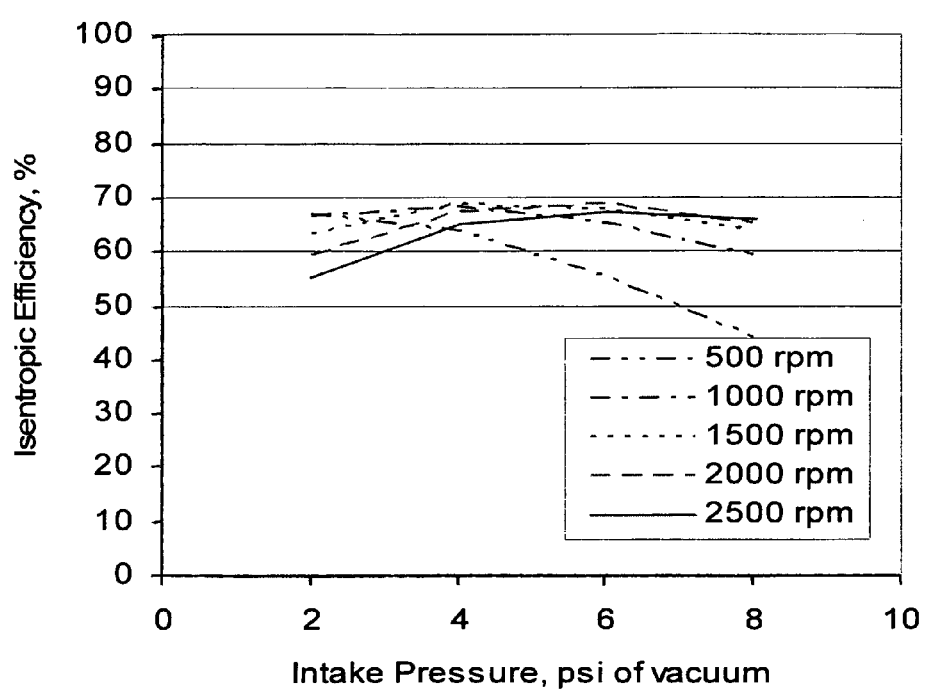
FIG. 29 is a plot, obtained during evaluation of the first representative embodiment of the integrated expander/compressor, of isentropic efficiency of the compressor operating with room-temperature air, as a working fluid, drawn through a pressure-reducing regulator.
Figure 30:
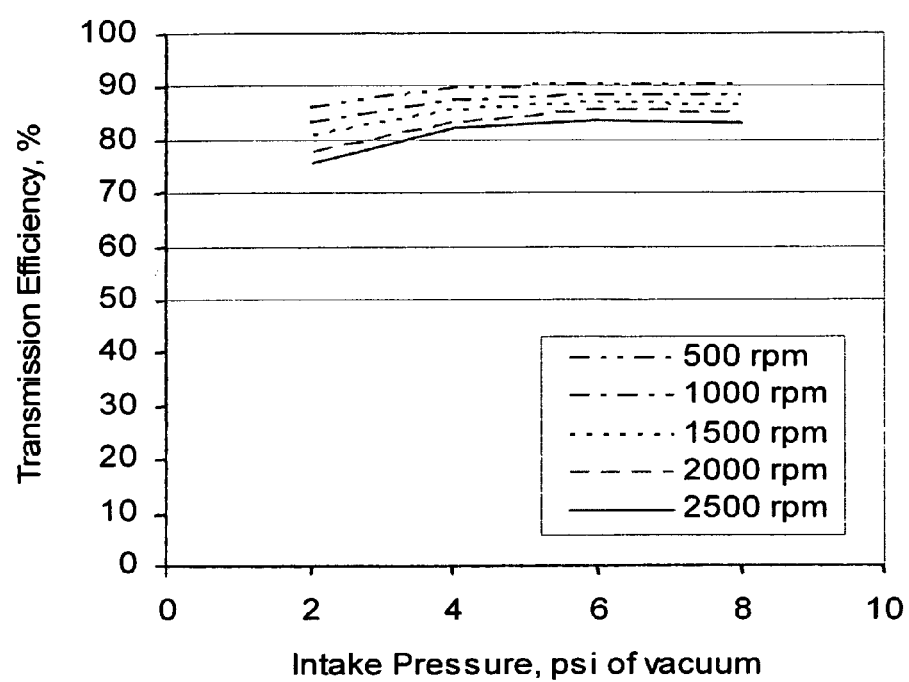
FIG. 30 is a plot of transmission efficiency calculated from the data shown in FIG. 29.

FIG. 29 shows isentropic efficiency of the compressor 384b operating with room-temperature air, as a working fluid, drawn through a pressure-reducing regulator. The compressor 384b discharged the air to the ambient atmosphere at atmospheric pressure. Maximum efficiency was 69%, which occurred at 2000 rpm and 6 psig of vacuum (a pressure ratio of 1.68). FIG. 30 shows the efficiency of transmission calculated from the same data. Unlike the expander 384a, in which friction causes most of the losses in that component, the largest losses in the compressor 384b were fluid losses such as piston leakage. At an intake pressure of 8 psi of vacuum, the mass-flow per revolution was 2.5 mg/rev at 2500 rpm versus 1.7 mg/rev at 500 rpm. This was consistent with gas leakage into cylinder during the intake stroke. The slower rotational period at 500 rpm allows more gas to leak in so that less is drawn in from the intake port.

Figure 31:
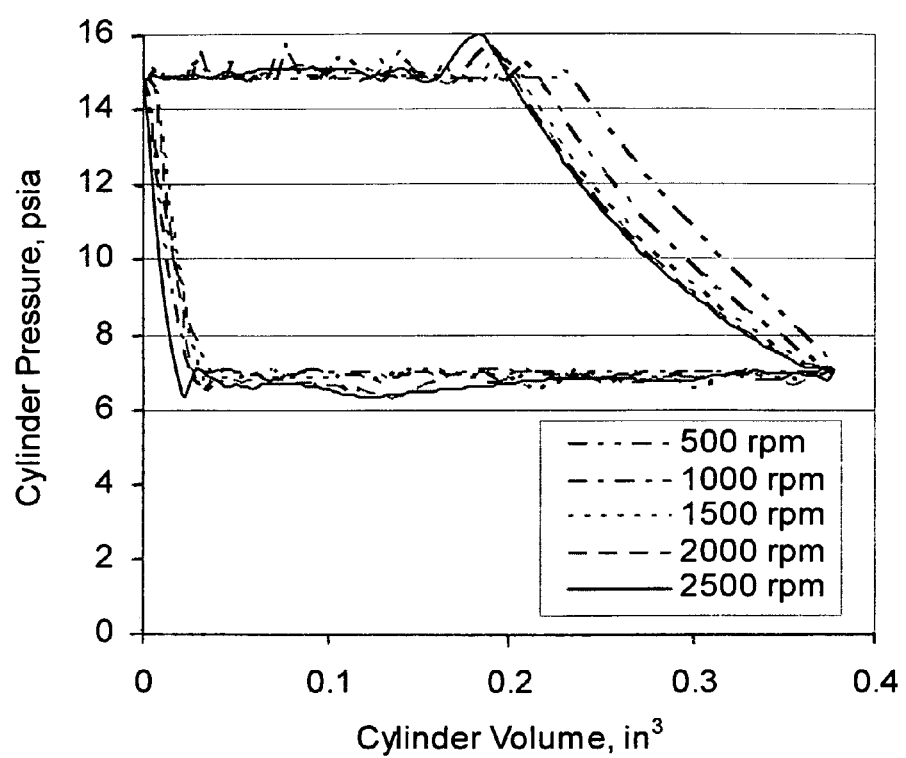
FIG. 31 is an array of P-V curves recorded from one cylinder of the compressor of the first embodiment of the integrated expander/compressor.

FIG. 31 shows P-V curves recorded from one cylinder of the compressor 384b. In the figure, leakage effects are evident on the compression portion of the curves where the pressure rises more rapidly at 500 rpm than at higher speeds.

Figure 32:
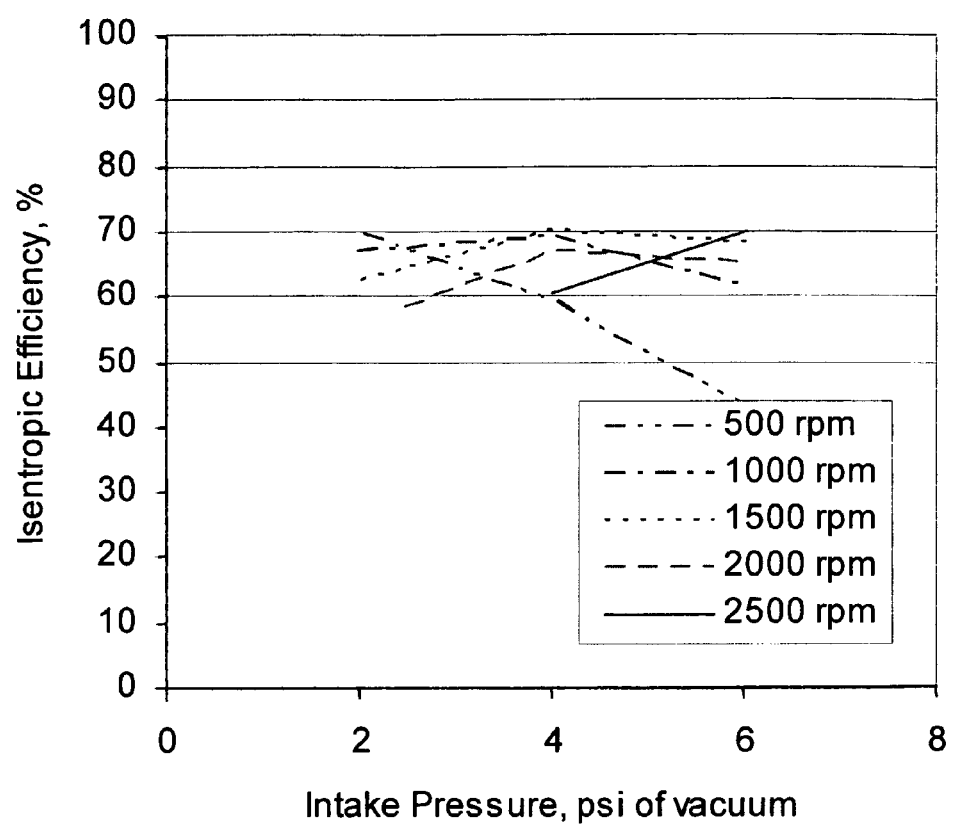
FIG. 32 is a plot of the isentropic efficiency of the compressor, of the first embodiment of the integrated expander/compressor, operating on HFE-7000 as a working fluid and at various stated shaft rotational speeds.

The isentropic efficiency of the compressor 384a operating on HFE-7000 vapor is shown in FIG. 32, in which the operating speed of the compressor was varied from 500 to 2500 rpm. The exhaust pressure varied, according to the saturation pressure of the liquid in the enclosure, from 10.8 to 11.1 psia. The intake pressure was varied to obtain 2, 4, or 6 psi of vacuum relative to the exhaust pressure. Because the mass-flow at 2 psi vacuum and 2500 rpm exceeded the capacity of the flow meter, this point is omitted. The maximum efficiency was 70% at 1500 rpm and 4 psi of vacuum. At lower speeds and greater inlet vacuum, leakage around the piston seals caused reduced efficiency, as shown by the 500-rpm data. As speed increased, the amount of leakage was reduced in proportion to the revolution period.

Figure 33:
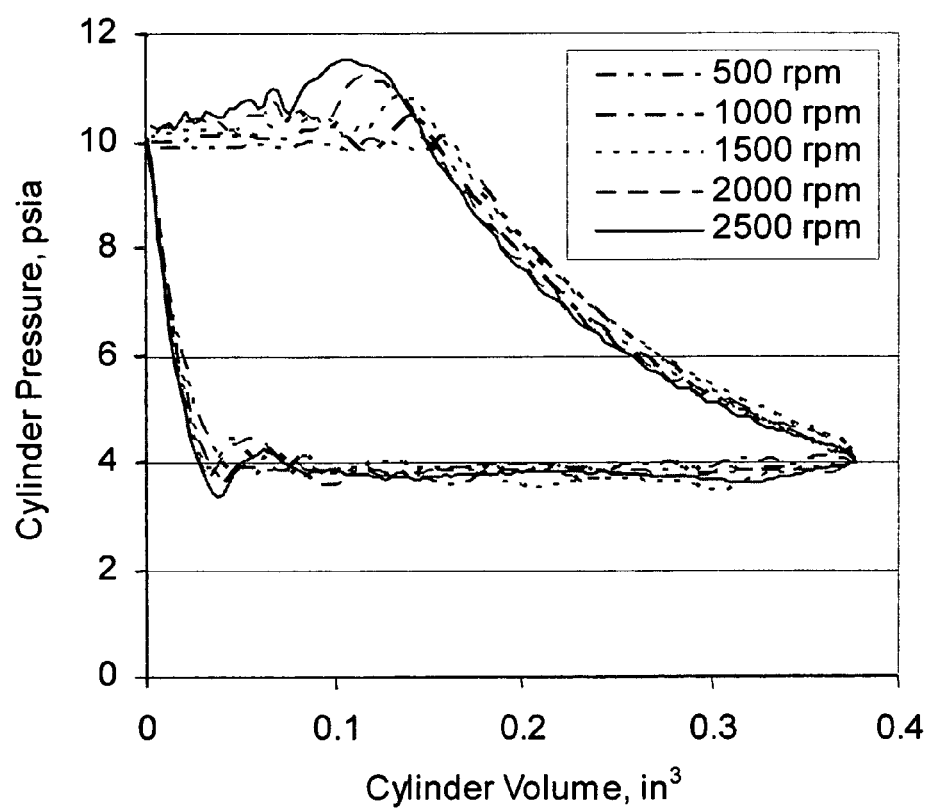
FIG. 33 is an array of P-V curves, obtained during an evaluation of one of the cylinders of the compressor evaluated in FIG. 32, having an inlet vacuum of 6 psi.

At lesser inlet vacuum and higher speed, efficiency was reduced by pressure drops in the intake and exhaust ports. FIG. 33 shows P-V curves recorded from one cylinder with 6 psi inlet vacuum. In the figure, the pressure drop through the exhaust is evident by the pressure above 10 psia at the top of the curve, while the pressure drop through the inlet is evident by the pressure below 4 psia at the bottom of the curve. These pressure drops result in added work done by the piston for the same mass of gas compressed. As a result, the efficiency drops as pressure-drop increases with speed. The impact on efficiency is greatest for a small intake vacuum where the added work to overcome the pressure drops is a greater fraction of the overall work.

Figure 34:
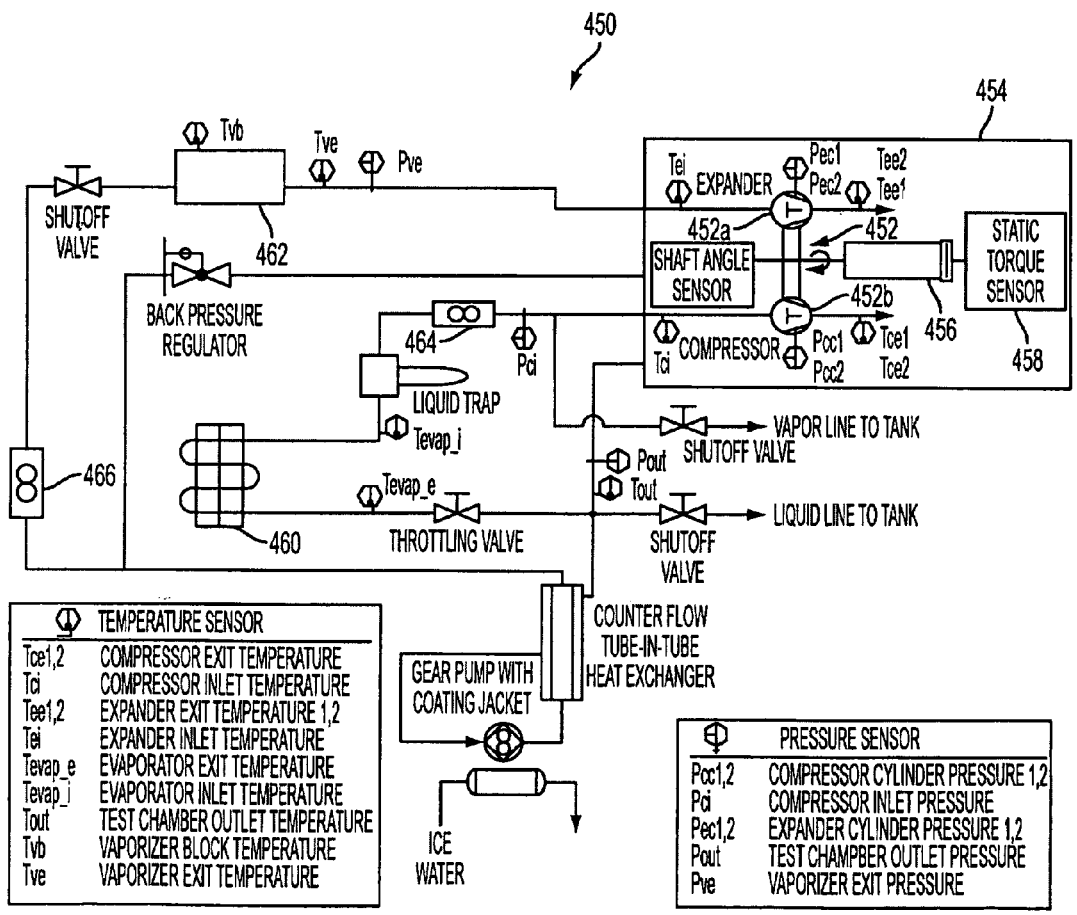
FIG. 34 is a schematic diagram of a test circuit used for performing further evaluations of the first representative embodiment of the integrated expander/compressor. The depicted test circuit is configured to perform an energy balance on an operating expander/compressor.

Another series of tests were performed on the integrated expander/compressor using the test apparatus 450 diagrammed in FIG. 34, configured to perform an energy balance on an operating integrated expander/compressor 452. The integrated expander/compressor 452 was placed in the test chamber 454 located in the upper right corner of the diagram. A small-scale dynamometer was used to monitor the shaft power generated by the expander 452a and provided a measure of the power input needed by the compressor 452b. The dynamometer comprised a cradled motor 456 and a high-accuracy static torque sensor 458. Other notable components of the test apparatus 450 included a cold-side evaporator 460, a hot-side vaporizer 462, and various temperature-, pressure-, and flow-measurement devices required for monitoring of system performance. The test chamber 454 doubled as a condenser. Flow-rate measurements were key for determining overall cycle performance and for calculating component efficiencies for the expander 452a and compressor 452b. A mass-flow meter/controller 464 was used for determining mass-flow rates of vapor, and a high-accuracy coriolis-type flow meter 466 was used for measuring liquid flow at the inlet to the vaporizer 462. All measurements were collected by a computerized data-acquisition system that allowed performance data to be displayed on a computer screen in real-time. The data-acquisition system also displayed pressure-volume (P-V) curves for the expansion and compression processes occurring within the cylinders of the expander/compressor 452, which was very important for assessing sealing and valve operations.

The expander 452a was configured as described in the first representative embodiment, with cylinders made from hardened stainless steel for wear resistance and low friction. The cylinder head was aluminum alloy, and the valve block was made of PEEK. A silicone gasket formed a seal between the cylinder head and valve block. The pistons were capped with PPS to form the piston running surface. The pistons were each 0.5-inch in diameter with a stroke of 0.48 inch, for a total displacement of 0.189 in$^3$. Fixed valve timing gave the expander a volume-expansion ratio of approximately 3.1. The compressor 452b was configured as described in the first representative embodiment, with the two pistons each having a diameter of one inch. The compressor cylinders were provided with polymeric running surfaces made from PPS, and the sealing rings (including lip seals as described below) of the pistons were made of a Delrin-based composite with Teflon added.

The inlet and exhaust valves of the expander 452a were spring-loaded poppet-type valves actuated by spring-loaded tappets mounted within the pistons, as discussed above. The inlet and exhaust valves of the compressor 452b were passive flapper valves operating on the inherent pressure differential across each valve, as discussed above. Improved "breathing" of the compressor cylinders was accomplished by increasing the porting of the valves. Also, 0.003-inch thick spring steel was used for the flappers.

The respective cylinders in the expander and compressor utilized lip seals, as discussed above, to minimize cylinder leakage. By using a high-temperature polymeric material (PPS) to form the lip and piston running surfaces, the expander could be operated without lubrication. Typically, the outside diameter of an expander piston was approximately 100 micrometers less than the inside diameter of its cylinder. The piston seals in the compressor 452b were similar, although no high-temperature polymeric material was needed, so a Teflon-filled Delrin (having very good sealing capability at the lower temperatures encountered in the compressor) was used. (A factor in the consideration of using softer material for cylinder sealing is the pressure differential used for achieving sealing action. This pressure differential is orders of magnitude lower in the compressor than in the expander, which allows the use of a softer material in the compressor for achieving good contact of the lip against the cylinder wall during operation.) PPS is a good alternative material for making sliding surfaces of the compressor pistons. Although use of PPS is not strictly required for the compressor pistons, it has good frictional characteristics and also is compatible with many working fluids (e.g., no swelling of PPS was evident upon exposure to HFE-7000).

Testing described above showed that the particular embodiment of the expander that was tested exhibited an isentropic efficiency of up to 80% using room-temperature nitrogen as the working fluid. The following testing was directed to an expander/compressor configured to operate with a refrigerant working fluid at elevated temperatures (e.g., up to 125° C.). Results are set forth for the compressor operating on nitrogen and refrigerant and for the expander operating with heated nitrogen.

Figure 35:
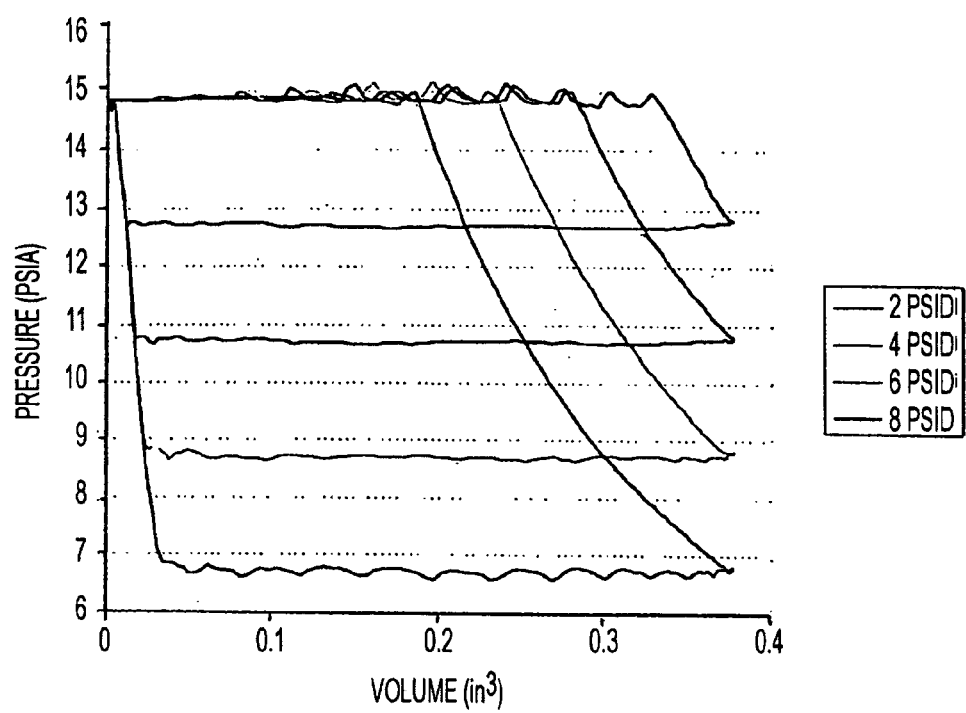
FIG. 35 is an array of P-V curves, obtained using the test circuit shown in FIG. 34, of a compressor operating at 500 rpm, with air being used as the working fluid.

FIG. 35 shows P-V curves obtained with the compressor operating at 500 rpm, with air being used as the working fluid. Each curve is a loop and proceeds counter-clockwise. The substantially horizontal portions extending across the bottoms of the respective curves correspond to inlet. The small undulations are due to flow-induced oscillation of the flapper valves. At the bottom right, the inlet valve closes as the piston reaches BDC. As the piston begins to travel upward, the cylinder charge is compressed until the cylinder pressure reaches the exhaust pressure (atmospheric in the test setup). The exhaust valve then opens and the cylinder charge is expelled as the piston moves to TDC. As the piston moves back down, the exhaust valve closes and the small amount of gas contained in the clearance space is expanded until the pressure drops to the intake pressure.

Figure 36:
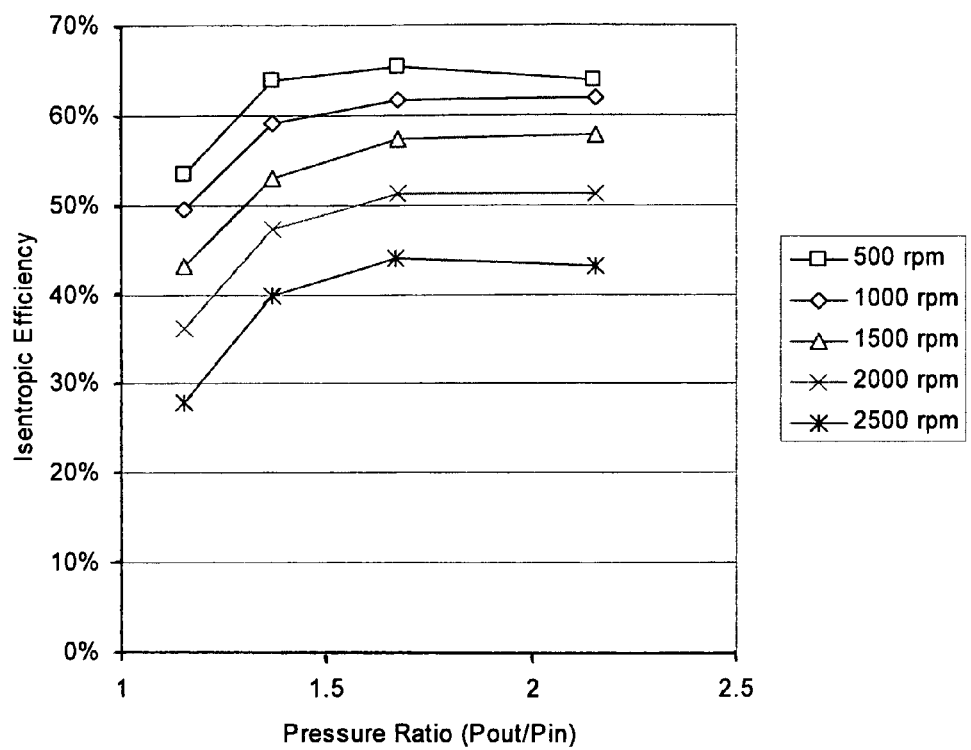
FIG. 36 is a plot of isentropic efficiency of the compressor evaluated in FIG. 35, operating at a range of shaft speeds and exhaust-to-inlet pressure ratios.

While these curves are nearly ideal, overall performance was reduced slightly by frictional losses between the piston and cylinder. FIG. 36 shows the efficiency of the compressor for a range of operating speeds and exhaust-to-inlet pressure ratios. At low speeds the compressor exhibited 65% efficiency. At higher speeds the efficiency was reduced by pressure drops through the inlet and exhaust valves. This flow loss can be reduced by using valves having larger ports.

Figure 37:
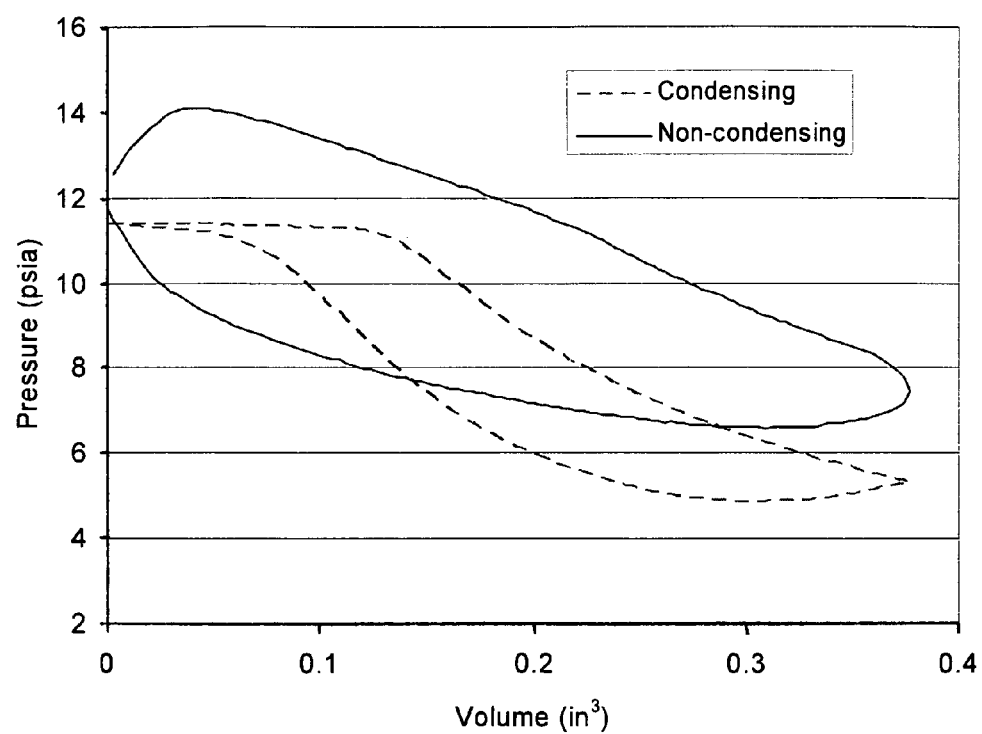
FIG. 37 is a P-V diagram showing the effect, upon the P-V behavior of the compressor evaluated in FIG. 35, of using refrigerant as the working fluid.

FIG. 37 shows the effect, upon the P-V behavior of the compressor, of using a fluorocarbon refrigerant as the working fluid. When the incoming vapor has a temperature near that of the cylinder walls, the vapor tends to condense on the walls during the compression stage. This condensed liquid re-evaporates during the subsequent expansion stage and results in the s-shaped "condensing" curve. As a result the compressor actually pumps very little refrigerant. If the incoming vapor is heated to a temperature above the temperature of the cylinder walls, condensation is avoided and more vapor is moved through the cylinders.

The higher density (seven times greater than air) of the vapor of the fluorocarbon refrigerant caused a greater pressure drop through the valves than experienced with air or nitrogen as a working fluid. The greater pressure drop resulted in a non-condensing curve exceeding 14 psia during the exhaust stroke, more than 2 psi higher than the exhaust pressure of 11.7 psia. Both phenomena, namely the pressure drop across the valves and condensation, would be reduced by using larger ports in the valves and using more insulation, respectively.

Figure 38:
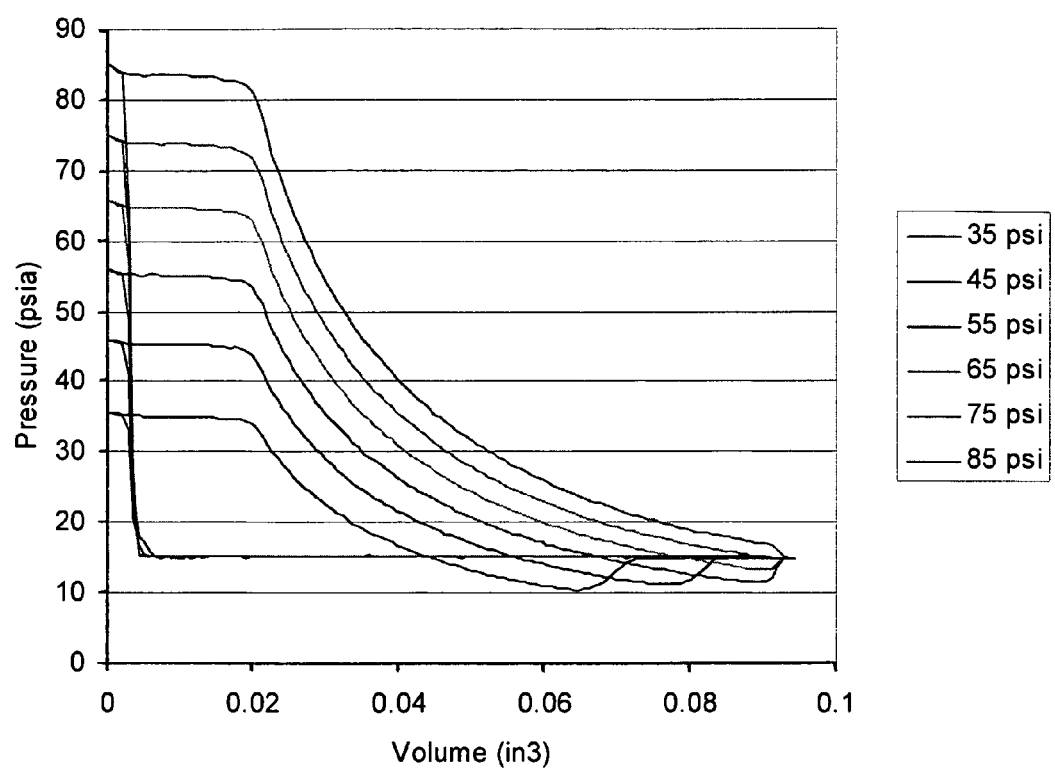
FIG. 38 is an array of P-V curves, obtained during evaluation of the first representative embodiment of the integrated expander/compressor using the system shown in FIG. 34, recorded with the expander operating at 1500 rpm while the inlet pressure varied from 35 psia to 85 psia.

FIG. 38 shows P-V curves obtained with the expander 452a operating at 1500 rpm while inlet pressure was varied from 35 psia to 85 psia. Each curve starts at the left and runs clockwise in a loop. The inlet phase is first and is indicated by the relatively straight linear sections extending across the tops of the loops. At about 0.025 in$^3$, the inlet valve closes and expansion begins. The forced opening of the exhaust valve at the end of the expansion is indicated by the sudden drop in pressure near 0.09 in$^3$. The exhaust stroke corresponds to the linear portions extending across the bottoms and ends of the curves when the exhaust valve closes at 0.015 in³. A slight recompression occurs before the inlet valve opens just before TDC.

Figure 39:
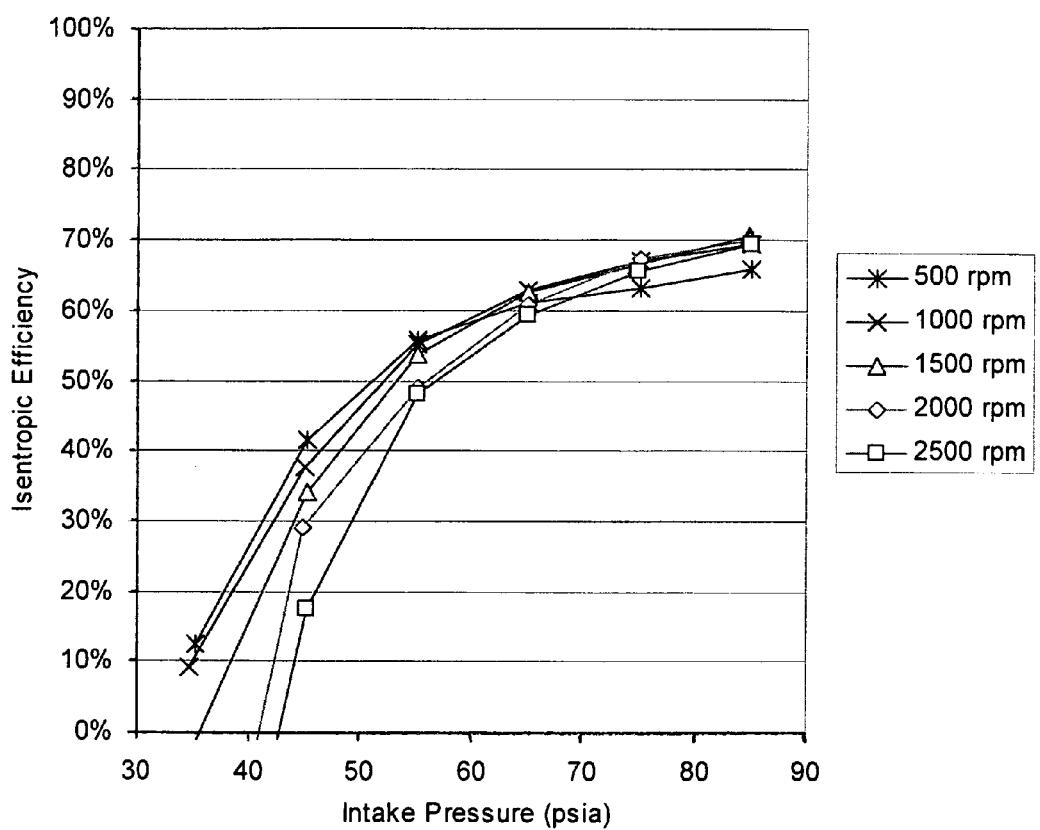
FIG. 39 is a plot, obtained during evaluation of the first representative embodiment of the integrated expander/compressor using the system of FIG. 34, of calculated isentropic efficiency of the expander as a function of shaft speed for various inlet pressures.

FIG. 39 shows the calculated isentropic efficiency of the expander as a function of speed for inlet pressures ranging from 35 psia to 85 psia (20 psig to 70 psig). At the highest pressure, the isentropic efficiency reaches 70%. At lower pressures, overexpansion of the gas can result in negative cylinder pressures before the exhaust valve opens.

Any of various modifications to the system 10 are possible, depending at least to some extent on the overall size of the system and the cooling application to which the system will be applied.

As a first example, a thermoelectric converter ("TEC") can be disposed between the combustor 20 and the boiler 22 to supply electrical power for certain tasks and at certain times. For starting the system 10, certain fluid paths (e.g., conduits connected to the expander 16 as well as the expander itself) desirably are pre-heated to prevent condensation. Such pre-heating can be achieved using one or more heaters driven from a battery that is recharged with power generated by the TEC. The film heaters desirably are flexible, high-temperature ribbon heaters that are capable of withstanding temperatures up to 200° C. A TEC also can be useful as an auxiliary source of electrical power for use in driving fans (e.g., for the combustor 20 and/or the condenser 26) and/or a small pump for fuel delivery from the tank 34 to the combustor 20. Currently available TECs have relatively low efficiency, which would allow most of the heat from the combustor 20 to pass through the TEC to the boiler 22. The TEC would operate at about 5% efficiency with a hot side at approximately 400° C. to 800° C., while the cool side of the TEC would operate at or near the temperature of the boiler 22 (e.g., approximately 200° C.). Thus, electrical power for "balance of plant" and startup tasks, for example, can be generated readily.

With respect to a second example, for miniaturized systems 10, the expander 16 and compressor 18 desirably maintain high efficiency while operating at a sufficiently high mass-flow rate to produce a desired rate of cooling, taking into account disparate volumetric flow rates that could exist between the flow of working fluid in the power cycle 12 and refrigeration cycle 14. One way in which to address these criteria is to configure the expander as a radial-flow turbine that is coupled directly to a radial-flow compressor. This configuration can be more practical (than the piston configuration described above) for larger systems, whereas the piston configuration was observed to be more practical in most instances for miniaturized systems. For example, with smaller systems employing rotary expanders and compressors, small-diameter turbine rotors (e.g., diameter of one inch) typically exhibit very high rotational velocities, and sealing between the rotor and its housing is difficult to achieve with small rotors. Hence, positive-displacement configurations for the expander 16 and compressor 18 are desirable for small-scale systems (e.g., performing less than 1 kW of cooling). Positive-displacement configurations (e.g., pistons operating in cylinders) also tend to pose less problems with valving of fluids into and out of the components.

What is claimed is:

1. A heat-activated heat-pump system, comprising a power cycle coupled to a vapor-compression refrigeration cycle both utilizing the same working fluid;
the power cycle comprising a boiler that vaporizes and superheats the working fluid, an expander coupled to receive superheated vapor from the boiler and configured to produce work from the superheated vapor, a condenser coupled to receive working fluid from the expander and configured to condense the working fluid, a pump coupled to receive condensed working fluid from the condenser and to return the working fluid to the boiler, and a regenerator coupled to conduct a first stream of the working fluid from the pump to the boiler and to conduct a second stream of the working fluid from the expander to the condenser while transferring heat from the second stream to the first stream;
the refrigeration cycle comprising the condenser, a pressure-reducing throttling valve, an evaporator coupled to receive reduced-pressure working fluid via the throttling valve from the condenser and configured to expand the working fluid sufficiently to cool the working fluid, and a compressor configured to compress the working fluid from the evaporator and to deliver the compressed working fluid to the condenser; and
the expander and compressor being coupled together such that at least a portion of the work produced by the expander is utilized for running the compressor, the expander being configured to achieve expansion of the superheated vapor of the working fluid substantially adiabatically and substantially isentropically.

2. The system of claim 1, wherein the power cycle is a Rankine power cycle.

3. The system of claim 1, wherein the pump is coupled to the expander such that a portion of the work produced by the expander is utilized for running the pump.

4. The system of claim 1, wherein the expander and the compressor are integrated with each other.

5. The system of claim 4, wherein:
the expander comprises a shaft that is rotated by work produced in the expander;
the compressor comprises a shaft; and
the shaft of the expander is coupled to the shaft of the compressor.

6. The system of claim 4, wherein the integrated expander and compressor exhibit an isentropic efficiency of at least 70%.

7. The system of claim 1, further comprising a combustor coupled to the boiler, the combustor being configured to combust a fuel to generate heat sufficient to vaporize and superheat the working fluid, and to supply the heat to the working fluid in the boiler.

8. The system of claim 7, wherein the fuel is a hydrocarbon fuel.

9. The system of claim 7, wherein the combustor and the boiler are integrated with each other such that heat produced in the combustor is transferred in the boiler directly to the working fluid.

10. The system of claim 1, wherein the working fluid is isopentane.

11. The system of claim 1, wherein the working fluid is a fluorinated-hydrocarbon refrigerant.

12. The system of claim 1, further comprising a coolant cycle coupled to the evaporator, the coolant cycle being configured to urge flow of a coolant from the evaporator, in which the coolant surrenders heat to the working fluid, to a cooling zone at which the coolant absorbs heat from a region in thermal contact with the cooling zone.

13. The system of claim 12, wherein:
the coolant is water; and
the cooling zone is a water chest in thermal contact with a person's body so as to cool the person's body.

14. The system of claim 13, wherein the cooling zone is a heat-exchanger configured to cool vehicular air in thermal contact with the heat-exchanger.

15. The system of claim 1, further comprising at least one balance-of-plant component coupled to the expander in a manner allowing the balance-of-plant component to capture and utilize a portion of the work produced by the expander.

16. The system of claim 1, wherein at least one of the boiler, the evaporator, the condenser, and the regenerator comprises microfluidic channels for conducting the working fluid and for conducting heat relative to the working fluid.

17. The system of claim 1, wherein at least one of the boiler, the evaporator, the condenser, and the regenerator comprises microtubules for conducting the working fluid and for conducting heat relative to the working fluid.

18. The system of claim 1, wherein at least one of the expander and compressor is positive-displacement.

19. The system of claim 1, wherein both the expander and compressor are positive-displacement.

20. The system of claim 19, wherein each of the expander and compressor comprises at least one respective piston that is movable relative to a respective cylinder.

21. The system of claim 20, wherein:
the expander comprises two respective pistons in respective cylinders; and
the compressor comprises two respective pistons in respective cylinders.

22. The system of claim 21, wherein:
the expander pistons operate 180° out of phase with each other; and
the compressor pistons operate 180° out of phase with each other.

23. The system of claim 22, wherein the expander pistons and the compressor pistons are coupled to a common shaft that is rotated by translation of reciprocating motion of the expander pistons to the shaft.

24. The system of claim 21, wherein:
the expander comprises, for each cylinder thereof, a respective inlet valve and respective outlet valve that control flow of working fluid into and out of the cylinder; and
the inlet valves and outlet valves are actuated in a self-timed manner in coordination with reciprocating motion of the respective actuator pistons.

25. The system of claim 24, wherein the inlet valves and outlet valves of the expander comprise respective poppets that are actuated by reciprocating motion of the respective pistons in the cylinders.

26. The system of claim 25, wherein:
each expander piston comprises a respective tappet for the respective inlet valve and outlet valve; and
during reciprocating motion of the expander pistons, the tappets engage respective poppets of the respective inlet and outlet valves.

27. The system of claim 21, wherein:
the compressor comprises, for each cylinder thereof, a respective inlet valve and respective outlet valve that control flow of working fluid into and out of the cylinder; and
the inlet valves and outlet valves are actuated in a self-timed manner in coordination with reciprocating motion of the respective compressor pistons.

28. The system of claim 27, wherein the inlet valves and outlet valves of the compressor comprise respective flappers that open and close automatically at respective times during reciprocating motion of the respective compressor pistons.

29. The system of claim 1, wherein the boiler is configured to heat the working fluid at substantially constant pressure.

30. A vehicle comprising an air-conditioning system including a heat-pump system as recited in claim 1 situated and configured to adjust the temperature of air in the vehicle.

31. A suit configured to be worn by a person, the suit comprising a heat-pump system as recited in claim 1 situated and configured to adjust the temperature of the person wearing the suit.

32. In a heat-activated heat-pump system including a power cycle coupled to a vapor-compression refrigeration cycle both utilizing the same working fluid, an integrated expander/compressor, comprising:
an expander situated in the power cycle and that produces work from superheated vapor of the working fluid introduced to the expander, the expander comprising a first pair of movable pistons disposed in respective stationary cylinders, the pistons being coupled to a shaft and configured to move reciprocatingly, while rotating the shaft, 180° out of phase with each other, each of the cylinders comprising respective inlet and outlet valves that are actuated by movement of the respective piston; and
a compressor situated in the refrigeration cycle and that compresses the working fluid from the evaporator, the compressor comprising a second pair of movable pistons disposed in respective stationary cylinders, the pistons being coupled to the shaft such that at least a portion of the work produced by the expander is utilized for running the compressor, the pistons of the compressor and configured to move reciprocatingly, with rotation of the shaft, 180° out of phase with each other; each of the cylinders comprising respective inlet and outlet valves that are actuated by movement of the respective piston.

33. The system of claim 32, wherein the inlet valves and outlet valves of the expander comprise respective poppets that are actuated by reciprocating motion of the respective pistons in the cylinders.

34. The system of claim 32, wherein:
each expander piston comprises a respective tappet for the respective inlet valve and outlet valve; and
during reciprocating motion of the expander pistons, the tappets engage respective poppets of the respective inlet and outlet valves.

35. The system of claim 32, wherein the inlet valves and outlet valves of the compressor are actuated in a self-timed manner in coordination with reciprocating motion of the respective compressor pistons.

36. The system of claim 35, wherein the inlet valves and outlet valves comprise respective flappers that open and close automatically at respective times during reciprocating motion of the respective compressor pistons.

37. A cooling system, comprising:
a refrigeration cycle coupled to a power cycle that drives the refrigeration cycle and uses a same working fluid as the refrigeration cycle;
the power cycle comprising a boiler that receives waste heat by which the boiler vaporizes and superheats the working fluid, an expander that receives superheated vapor from the boiler and produces work from the superheated vapor, a condenser that receives working fluid from the expander and condenses the working fluid, a pump that receives condensed working fluid from the condenser and returns the working fluid to the boiler, and a regenerator that conducts a first stream of the working fluid from the pump to the boiler and a second stream of the working fluid from the expander to the condenser while transferring heat from the second stream to the first stream;

the refrigeration cycle comprising the condenser, an evaporator that receives working fluid from the condenser and internally evaporates the working fluid in a manner that cools the working fluid in the evaporator, a compressor that compresses the working fluid from the evaporator and delivers the compressed working fluid to the condenser, and a throttling valve that delivers working fluid from the condenser to the evaporator while reducing the pressure of the working fluid; and the expander and compressor being coupled together such that at least a portion of the work produced by the expander is utilized directly for running the compressor, and the expander is configured to achieve expansion of the superheated vapor of the working fluid substantially adiabatically and substantially isentropically.

38. The cooling system of claim 37, further comprising a circulation loop to and from the evaporator, the circulation loop conducting a liquid that is circulated to the evaporator for cooling of the liquid.

39. The cooling system of claim 38, wherein the cooled liquid is circulated to a cooling zone in thermal contact with a thing so to cool the thing.

40. The cooling system of claim 39, wherein the cooling zone is in contact with a person so as to cool the person.

41. The cooling system of claim 39, wherein the cooling zone is contacted by air in a vehicle so as to cool the air in the vehicle.

42. A heat-activated heat-pump system, comprising power-cycle means coupled to refrigeration-cycle means both utilizing the same working fluid;

said power-cycle means comprising superheating means for vaporizing and superheating the working fluid, work-producing means for producing work from superheated vapor received from said superheating means, condensing means for condensing the working fluid received from said work-producing means, pump means for delivering condensed working fluid from said condensing means to said superheating means, and regenerator means for transferring heat, from a first stream of working fluid flowing from said work-producing means to said condensing means, to a second stream of working fluid flowing from said pump means to said superheating means;

said refrigeration-cycle means comprising said condensing means, pressure-reducing means for reducing pressure of the working fluid from said condensing means, evaporator means for expanding working fluid, received via said pressure-reducing means from said condensing means, sufficiently to cool the working fluid, and compressing means for compressing working fluid received from said evaporator means for delivery to said condensing means; and said work-producing means and said compressing means being coupled together such that at least a portion of the work produced by said work-producing means is utilized for running said compressing means.

43. The system of claim 42, further comprising combusting means for combusting a fuel to produce waste heat and for supplying waste heat to said superheating means sufficiently for the superheating means to vaporize and superheat the working fluid.

44. The system of claim 43, wherein said combusting means and said superheating means are integrated with each other.

45. The system of claim 42, wherein said work-producing means comprises expansion means for expanding the superheated working fluid in a manner by which work is produced.

46. The system of claim 42, wherein said work-producing means and said compressing means are integrated with each other.

47. The system of claim 42, further comprising coolant-cycle means for circulating a coolant from said evaporating means to a cooling zone.

48. The system of claim 47, wherein the cooling zone is in thermal contact with a body of a person.

49. The system of claim 47, wherein the cooling zone is in thermal contact with air in a vehicle interior.

50. The system of claim 42, wherein said work-producing means and said compressing means each comprise positive-displacement means for moving the working fluid through said work-producing means and compressing means.

51. A protective-suit means, comprising a system as recited in claim 42, the system being coupled to said protective-suit means in a manner by which the system cools said protective-suit means.

52. A method for removing heat from a body, comprising:
thermally contacting the body with a coolant such that the coolant picks up and removes heat from the body;
circulating the coolant through an evaporator, of a refrigeration cycle utilizing a working fluid, so as to contact the coolant thermally with working fluid cooled in the evaporator;
circulating a first portion of the working fluid through the refrigeration cycle so as to remove heat from the working fluid, the refrigeration cycle including a compressor situated downstream of the evaporator; and
circulating a second portion of the working fluid through a power cycle including a boiler, an expander situated downstream of the boiler, a first compartment of a regenerator situated upstream of the boiler, and a second compartment of the regenerator situated downstream of the expander, such that heat exchange occurs in the regenerator between the first and second compartments.

53. The method of claim 52, wherein the step of circulating the first portion of the working fluid through the refrigeration cycle further comprises passing the first portion of the working fluid through a compressor situated downstream of the evaporator.

54. The method of claim 53, wherein circulating the second portion of the working fluid through the expander produces work, the method further comprising coupling the compressor to the expander such that at least a portion of the work is utilized for operating the compressor.

55. A method for removing heat from a body, comprising:
thermally contacting the body with a coolant such that the coolant picks up heat from the body;
circulating the coolant through an evaporator, of a refrigeration cycle utilizing a working fluid, so as to contact the coolant thermally with working fluid cooled in the evaporator;
circulating a first portion of the working fluid through the evaporator to cool the working fluid and thus the coolant, through a compressor to compress the working fluid, through a condenser to condense and heat the working fluid, and back to the evaporator;
circulating a second portion of the working fluid from the condenser through a first compartment of a regenerator to a boiler, through the boiler to superheat the working fluid, through an expander to expand the superheated working fluid and to extract and utilize work from the superheated working fluid, and through a second compartment of the regenerator back to the condenser;
combining the second portion of the working fluid from the second compartment of the regenerator with the first portion to produce a combined stream of working fluid entering the condenser; and in the regenerator, transferring heat from the working fluid in the second compartment to the working fluid in the first compartment.

56. The method of claim 55, further comprising:

combusting a fuel in a combustor to produce heat; and providing the heat to the boiler.

57. The method of claim 55, further comprising coupling the expander to the compressor so as to utilize at least a portion of the work extracted by the expander for running the compressor.

58. The method of claim 55, wherein the body is of a person.

59. The method of claim 55, wherein the body is of air.

* * * * *